United States Patent
Gardiner et al.

(10) Patent No.: US 10,395,227 B2
(45) Date of Patent: *Aug. 27, 2019

(54) SYSTEM AND METHOD FOR RECONCILING ELECTRONIC TRANSACTION RECORDS FOR ENHANCED SECURITY

(71) Applicant: Tactilis Sdn Bhd, Mont Kiara, Kuala Lumpur (MY)

(72) Inventors: Michael Gardiner, Kuala Lumpur (MY); Adriano Canzi, Los Angeles, CA (US)

(73) Assignee: TACTILIS PTE. LIMITED, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 14/596,420

(22) Filed: Jan. 14, 2015

(65) Prior Publication Data

US 2016/0203481 A1    Jul. 14, 2016

(51) Int. Cl.
*G06F 19/00* (2018.01)
*H04L 29/08* (2006.01)
*G06Q 20/20* (2012.01)
*G06Q 20/38* (2012.01)
*G06Q 20/40* (2012.01)

(52) U.S. Cl.
CPC .......... *G06Q 20/20* (2013.01); *G06Q 20/382* (2013.01); *G06Q 20/40145* (2013.01)

(58) Field of Classification Search
CPC ............................... G06F 19/323; H04L 67/10
See application file for complete search history.

(56) References Cited

U.S. PATENT DOCUMENTS

| 4,453,074 A | 6/1984 | Weinstein et al. |
| 4,582,985 A | 4/1986 | Loefberg |

(Continued)

FOREIGN PATENT DOCUMENTS

| AU | 200238203 C | 11/2002 |
| AU | 757159 B2 | 2/2003 |

(Continued)

OTHER PUBLICATIONS

Jung, Stefan, "A Low-Power and High-Performance CMOS Fingerprint Sensing and Encoding Architecture," IEEE Journal of Solid-State Circuits, Jul. 1999, pp. 978-984, vol. 34, No. 7.

(Continued)

*Primary Examiner* — Talia F Crawley
(74) *Attorney, Agent, or Firm* — Sheppard Mullin Richter & Hampton LLP

(57) ABSTRACT

A system and method for enhancing security of an electronic transaction is described. The method comprises receiving a request for an authentication of an electronic portable transaction device in connection with a new electronic transaction involving the electronic portable transaction device; retrieving a first record of one or more previous electronic transactions involving the electronic portable transaction device from a first storage device; retrieving a second record of one or more previous electronic transactions involving the electronic portable device from a second storage device; and determining whether the first record and the second record are reconcilable.

10 Claims, 9 Drawing Sheets

(56) References Cited

U.S. PATENT DOCUMENTS

| | | |
|---|---|---|
| 4,725,719 A | 2/1988 | Oncken et al. |
| 4,747,147 A | 5/1988 | Sparrow |
| 4,910,521 A | 3/1990 | Mellon |
| 4,993,068 A | 2/1991 | Piosenka et al. |
| 5,175,416 A | 12/1992 | Mansvelt et al. |
| 5,180,901 A | 1/1993 | Hiramatsu |
| 5,180,902 A | 1/1993 | Schick et al. |
| 5,193,114 A | 3/1993 | Moseley et al. |
| 5,245,329 A | 9/1993 | Gokcebay |
| 5,259,649 A | 11/1993 | Shomron |
| 5,321,751 A | 6/1994 | Ray et al. |
| 5,438,184 A | 8/1995 | Roberts et al. |
| 5,461,217 A | 10/1995 | Claus et al. |
| 5,513,272 A | 4/1996 | Bogosian et al. |
| 5,521,363 A | 5/1996 | Tannenbaum |
| 5,521,966 A | 5/1996 | Friedes et al. |
| 5,534,857 A | 7/1996 | Laing et al. |
| 5,539,825 A | 7/1996 | Akiyama et al. |
| 5,541,985 A | 7/1996 | Ishii |
| 5,559,504 A | 9/1996 | Itsumi et al. |
| 5,559,887 A | 9/1996 | Davis et al. |
| 5,577,121 A | 11/1996 | Davis et al. |
| 5,578,808 A | 11/1996 | Taylor et al. |
| 5,581,630 A | 12/1996 | Bonneau et al. |
| 5,590,038 A | 12/1996 | Pitroda |
| 5,590,197 A | 12/1996 | Chen et al. |
| 5,602,918 A | 2/1997 | Chen et al. |
| 5,604,801 A | 2/1997 | Dolan et al. |
| 5,613,001 A | 3/1997 | Bakhoum |
| 5,677,953 A | 10/1997 | Dolphin |
| 5,703,753 A | 12/1997 | Mok |
| 5,721,781 A | 2/1998 | Deo et al. |
| 5,737,439 A | 4/1998 | Lapsley et al. |
| 5,739,512 A | 4/1998 | Tognazzini |
| 5,742,756 A | 4/1998 | Dillaway et al. |
| 5,742,845 A | 4/1998 | Wagner |
| 5,757,917 A | 5/1998 | Rose et al. |
| 5,764,789 A | 6/1998 | Pare, Jr. et al. |
| 5,778,173 A | 7/1998 | Apte et al. |
| 5,796,831 A | 8/1998 | Paradinas et al. |
| 5,799,087 A | 8/1998 | Rosen |
| 5,806,045 A | 9/1998 | Biorge et al. |
| 5,815,252 A | 9/1998 | Price et al. |
| 5,815,657 A | 9/1998 | Williams et al. |
| 5,826,241 A | 10/1998 | Stein et al. |
| 5,826,243 A | 10/1998 | Musmanno et al. |
| 5,835,894 A | 11/1998 | Adcock et al. |
| 5,838,818 A | 11/1998 | Herley et al. |
| 5,857,079 A | 1/1999 | Claus et al. |
| 5,869,822 A | 2/1999 | Meadows et al. |
| 5,875,432 A | 2/1999 | Sehr |
| 5,884,271 A | 3/1999 | Pitroda |
| 5,884,292 A | 3/1999 | Baker et al. |
| 5,889,941 A | 3/1999 | Tushie |
| 5,892,211 A | 4/1999 | Davis et al. |
| 5,898,838 A | 4/1999 | Wagner |
| 5,901,239 A | 5/1999 | Kamei |
| 5,905,908 A | 5/1999 | Wagner |
| 5,907,620 A | 5/1999 | Klemba et al. |
| 5,912,446 A | 6/1999 | Wong et al. |
| 5,915,973 A | 6/1999 | Hoehn et al. |
| 5,917,913 A | 6/1999 | Wang et al. |
| 5,917,925 A | 6/1999 | Moore et al. |
| 5,920,058 A | 7/1999 | Weber et al. |
| 5,920,629 A | 7/1999 | Rosen |
| 5,920,847 A | 7/1999 | Kolling et al. |
| 5,930,767 A | 7/1999 | Reber et al. |
| 5,931,917 A | 8/1999 | Nguyen et al. |
| 5,936,226 A | 8/1999 | Aucsmith |
| 5,942,761 A | 8/1999 | Tuli |
| 5,978,495 A | 11/1999 | Thomopoulos |
| 5,987,155 A | 11/1999 | Dunn et al. |
| 5,988,497 A | 11/1999 | Wallace et al. |
| 5,991,411 A * | 11/1999 | Kaufman ............ G06Q 20/085 235/379 |
| 5,995,014 A | 11/1999 | DiMaria |
| 6,012,039 A | 1/2000 | Hoffman et al. |
| 6,012,636 A | 1/2000 | Smith et al. |
| 6,016,476 A | 1/2000 | Maes et al. |
| 6,018,739 A | 1/2000 | McCoy et al. |
| 6,041,410 A | 3/2000 | Shi et al. |
| 6,047,281 A | 4/2000 | Wilson et al. |
| 6,047,282 A | 4/2000 | Wilson et al. |
| 6,060,815 A | 5/2000 | Nysen |
| 6,070,159 A | 5/2000 | Wilson et al. |
| 6,091,835 A | 7/2000 | Smithies et al. |
| 6,095,413 A | 8/2000 | Tetro et al. |
| 6,101,477 A | 8/2000 | Hohle et al. |
| 6,104,311 A | 8/2000 | Lastinger |
| 6,104,922 A | 8/2000 | Baumann et al. |
| 6,116,736 A | 9/2000 | Stark et al. |
| 6,120,461 A | 9/2000 | Smyth |
| 6,130,623 A | 10/2000 | MacLellan et al. |
| 6,148,093 A | 11/2000 | McConnell et al. |
| 6,154,879 A | 11/2000 | Pare, Jr. et al. |
| 6,175,656 B1 | 1/2001 | Hoang |
| 6,182,892 B1 | 2/2001 | Angelo et al. |
| 6,199,079 B1 | 3/2001 | Gupta et al. |
| 6,199,762 B1 | 3/2001 | Hohle |
| 6,219,639 B1 | 4/2001 | Bakis et al. |
| 6,223,984 B1 | 5/2001 | Renner et al. |
| 6,233,348 B1 | 5/2001 | Fujii et al. |
| 6,256,690 B1 | 7/2001 | Carper |
| 6,257,486 B1 | 7/2001 | Teicher et al. |
| 6,257,620 B1 | 7/2001 | Kenney |
| 6,263,446 B1 | 7/2001 | Kausik et al. |
| 6,265,977 B1 | 7/2001 | Vega et al. |
| 6,268,788 B1 | 7/2001 | Gray |
| 6,269,348 B1 | 7/2001 | Pare, Jr. et al. |
| 6,270,011 B1 | 8/2001 | Gottfried |
| 6,272,562 B1 | 8/2001 | Scott et al. |
| 6,282,649 B1 | 8/2001 | Lambert |
| 6,298,146 B1 | 10/2001 | Ilan et al. |
| 6,307,956 B1 | 10/2001 | Black |
| 6,325,285 B1 * | 12/2001 | Baratelli ............ G06K 7/0021 235/380 |
| 6,327,578 B1 | 12/2001 | Linehan |
| 6,332,193 B1 | 12/2001 | Glass et al. |
| 6,338,048 B1 | 1/2002 | Mori |
| 6,338,435 B1 | 1/2002 | Carper |
| 6,345,761 B1 | 2/2002 | Seelbach et al. |
| 6,357,663 B1 | 3/2002 | Takahashi et al. |
| 6,360,953 B1 * | 3/2002 | Lin ................ G06K 19/07354 235/380 |
| 6,390,374 B1 | 5/2002 | Carper et al. |
| 6,424,249 B1 | 7/2002 | Houvener |
| 6,442,286 B1 | 8/2002 | Kramer |
| 6,446,862 B1 | 9/2002 | Mann |
| 6,480,825 B1 | 11/2002 | Sharma et al. |
| 6,480,935 B1 | 11/2002 | Carper et al. |
| 6,483,929 B1 | 11/2002 | Murakami et al. |
| 6,483,932 B1 | 11/2002 | Martinez et al. |
| 6,490,443 B1 | 12/2002 | Freeny, Jr. |
| 6,496,594 B1 | 12/2002 | Prokoski |
| 6,507,662 B1 | 1/2003 | Brooks |
| 6,519,565 B1 | 2/2003 | Clements et al. |
| 6,539,101 B1 | 3/2003 | Black |
| 6,560,581 B1 | 5/2003 | Fox et al. |
| 6,588,660 B1 | 7/2003 | Buescher et al. |
| 6,588,673 B1 | 7/2003 | Chan et al. |
| 6,591,249 B2 | 7/2003 | Zoka |
| 6,601,759 B2 | 8/2003 | Fife et al. |
| 6,601,762 B2 | 8/2003 | Piotrowski |
| 6,609,656 B1 | 8/2003 | Elledge |
| 6,615,191 B1 | 9/2003 | Seeley |
| 6,628,813 B2 | 9/2003 | Scott et al. |
| 6,629,591 B1 | 10/2003 | Griswold et al. |
| 6,631,201 B1 | 10/2003 | Dickinson et al. |
| 6,636,620 B1 | 10/2003 | Hoshino |
| 6,655,585 B2 | 12/2003 | Shinn |
| 6,657,614 B1 | 12/2003 | Ito et al. |
| 6,658,164 B1 | 12/2003 | Irving et al. |
| 6,662,166 B2 | 12/2003 | Pare, Jr. et al. |
| 6,669,086 B2 | 12/2003 | Abdi et al. |

(56) References Cited

U.S. PATENT DOCUMENTS

| | | |
|---|---|---|
| 6,681,328 B1 | 1/2004 | Harris et al. |
| 6,687,391 B1 | 2/2004 | Scott et al. |
| 6,697,947 B1 | 2/2004 | Matyas, Jr. et al. |
| 6,703,918 B1 | 3/2004 | Kita |
| 6,719,200 B1 | 4/2004 | Wiebe |
| 6,732,919 B2 | 5/2004 | Macklin et al. |
| 6,734,887 B2 | 5/2004 | Field |
| 6,744,909 B1 | 6/2004 | Kostrzewski et al. |
| 6,744,910 B1 | 6/2004 | McClurg et al. |
| 6,765,470 B2 | 7/2004 | Shinzaki |
| 6,776,332 B2 | 8/2004 | Allen et al. |
| 6,799,726 B2 | 10/2004 | Stockhammer |
| 6,816,058 B2 | 11/2004 | McGregor et al. |
| 6,819,219 B1 | 11/2004 | Bolle et al. |
| 6,826,000 B2 | 11/2004 | Lee et al. |
| 6,828,299 B2 | 12/2004 | Yang et al. |
| 6,828,960 B2 | 12/2004 | Parry |
| 6,834,795 B1 | 12/2004 | Rasmussen et al. |
| 6,867,850 B2 | 3/2005 | McClurg |
| 6,870,946 B1 | 3/2005 | Teng |
| 6,873,974 B1 | 3/2005 | Schutzer |
| 6,877,097 B2 | 4/2005 | Hamid et al. |
| 6,886,104 B1 | 4/2005 | McClurg et al. |
| 6,892,940 B2 | 5/2005 | Kocarev et al. |
| 6,901,154 B2 | 5/2005 | Dunn |
| 6,914,517 B2 | 7/2005 | Kinsella |
| 6,917,695 B2 | 7/2005 | Teng et al. |
| 6,925,439 B1 | 8/2005 | Pitroda |
| 6,925,565 B2 | 8/2005 | Black |
| 6,928,181 B2 | 8/2005 | Brooks |
| 6,928,195 B2 | 8/2005 | Scott et al. |
| 6,929,413 B2 | 8/2005 | Schofield |
| 6,931,538 B1 | 8/2005 | Sawaguchi |
| 6,934,861 B2 | 8/2005 | Haala |
| 6,944,768 B2 | 9/2005 | Siegel et al. |
| 6,954,260 B2 | 10/2005 | Arnold et al. |
| 6,968,453 B2 | 11/2005 | Doyle et al. |
| 6,970,582 B2 | 11/2005 | Langley |
| 6,971,031 B2 | 11/2005 | Haala |
| 6,983,062 B2 | 1/2006 | Smith |
| 6,988,665 B2 | 1/2006 | Schofield |
| 6,996,259 B2 | 2/2006 | Cannon et al. |
| 7,010,148 B2 | 3/2006 | Irving et al. |
| 7,028,893 B2 | 4/2006 | Goodman et al. |
| 7,049,962 B2 | 5/2006 | Atherton et al. |
| 7,051,925 B2 | 5/2006 | Schwarz, Jr. |
| 7,059,159 B2 | 6/2006 | Lanigan et al. |
| 7,059,531 B2 | 6/2006 | Beenau et al. |
| 7,068,822 B2 | 6/2006 | Scott |
| 7,073,711 B2 | 7/2006 | Fernandez et al. |
| 7,079,007 B2 | 7/2006 | Siegel et al. |
| 7,095,880 B2 | 8/2006 | Martinez et al. |
| 7,102,523 B2 | 9/2006 | Shanks et al. |
| 7,103,201 B2 | 9/2006 | Scott et al. |
| 7,127,088 B1 | 10/2006 | Grajewski et al. |
| 7,132,946 B2 | 11/2006 | Waldner et al. |
| 7,155,039 B1 | 12/2006 | Lo |
| 7,162,060 B1 | 1/2007 | Barton et al. |
| 7,164,440 B2 | 1/2007 | Cannon |
| 7,165,716 B1 | 1/2007 | Mödl et al. |
| 7,171,662 B1 | 1/2007 | Misra et al. |
| 7,181,017 B1 | 2/2007 | Nagel et al. |
| 7,203,344 B2 | 4/2007 | McClurg et al. |
| 7,218,202 B2 | 5/2007 | Bacchiaz et al. |
| 7,239,227 B1 | 7/2007 | Gupta et al. |
| 7,266,848 B2 | 9/2007 | Moyer et al. |
| 7,271,881 B2 | 9/2007 | Arnold et al. |
| 7,278,025 B2 | 10/2007 | Saito et al. |
| 7,289,649 B1 | 10/2007 | Walley et al. |
| 7,303,120 B2 | 12/2007 | Beenau et al. |
| 7,305,563 B2 | 12/2007 | Bacchiaz et al. |
| 7,308,122 B2 | 12/2007 | McClurg et al. |
| 7,314,164 B2 | 1/2008 | Bonalle et al. |
| 7,314,165 B2 | 1/2008 | Bonalle et al. |
| 7,319,565 B2 | 1/2008 | Arnold et al. |
| 7,325,724 B2 | 2/2008 | Bonalle et al. |
| 7,364,071 B2 | 4/2008 | Esplin |
| 7,466,348 B2 | 12/2008 | Morikawa et al. |
| 7,506,172 B2 | 3/2009 | Bhakta |
| 7,543,337 B2 | 6/2009 | D'Agnolo |
| 7,724,137 B2 | 5/2010 | Page |
| 7,730,526 B2 | 6/2010 | Lamplough |
| 7,751,593 B2 | 7/2010 | Hombo |
| 7,938,329 B2 | 5/2011 | Tran |
| 7,946,501 B2 | 5/2011 | Borracci |
| 7,992,789 B2 | 8/2011 | Borracci |
| 8,045,956 B2 * | 10/2011 | Sun ..................... G06Q 20/085 455/406 |
| 8,095,519 B2 * | 1/2012 | Delia .................. G06F 21/316 705/44 |
| 8,186,580 B2 | 5/2012 | Cannon et al. |
| 8,253,531 B2 | 8/2012 | Davis et al. |
| 8,275,353 B2 * | 9/2012 | Sun ..................... G06Q 20/085 455/406 |
| 8,276,816 B2 | 10/2012 | Gardner |
| 8,307,207 B2 | 11/2012 | Bacchiaz et al. |
| 8,360,322 B2 | 1/2013 | Bonalle et al. |
| 8,485,442 B2 | 7/2013 | McNeal |
| 8,490,872 B2 | 7/2013 | Kim |
| 8,499,164 B2 | 7/2013 | Ortiz et al. |
| 8,553,251 B2 | 10/2013 | Iizuka |
| 8,572,395 B2 | 10/2013 | Ito |
| 8,598,981 B2 | 12/2013 | Idsøe et al. |
| 8,607,063 B2 | 12/2013 | Ikeuchi |
| 8,708,230 B2 | 4/2014 | Cannon et al. |
| 8,713,660 B2 | 4/2014 | Carper |
| 8,756,680 B2 | 6/2014 | Shashidhar |
| 8,782,427 B2 | 7/2014 | Fedronic et al. |
| 8,783,578 B2 | 7/2014 | Kim |
| 8,786,033 B2 | 7/2014 | Saito |
| 8,799,167 B2 | 8/2014 | Carper |
| 2001/0049785 A1 | 12/2001 | Kawan |
| 2002/0059523 A1 | 5/2002 | Bacchiaz et al. |
| 2002/0095587 A1 | 7/2002 | Doyle et al. |
| 2002/0153424 A1 | 10/2002 | Li |
| 2003/0046554 A1 | 3/2003 | Leydier |
| 2003/0159044 A1 | 8/2003 | Doyle |
| 2004/0039909 A1 | 2/2004 | Cheng |
| 2004/0129787 A1 | 7/2004 | Saito et al. |
| 2004/0266267 A1 | 12/2004 | Inaba |
| 2005/0035200 A1 | 2/2005 | Hendrick |
| 2005/0125674 A1 | 6/2005 | Nishiki |
| 2005/0139685 A1 | 6/2005 | Kozlay |
| 2005/0144354 A1 | 6/2005 | Murashita |
| 2005/0161503 A1 | 7/2005 | Remery |
| 2005/0182947 A1 | 8/2005 | Bacchiaz et al. |
| 2005/0240778 A1 * | 10/2005 | Saito .................. G06K 19/0723 713/186 |
| 2006/0032905 A1 | 2/2006 | Bear |
| 2006/0070114 A1 | 3/2006 | Wood |
| 2006/0113381 A1 * | 6/2006 | Hochstein .......... G06K 19/0718 235/382 |
| 2006/0161789 A1 | 7/2006 | Doughty |
| 2006/0208066 A1 | 9/2006 | Finn |
| 2007/0033150 A1 | 2/2007 | Nwosu |
| 2007/0043594 A1 | 2/2007 | Lavergne |
| 2007/0073619 A1 | 3/2007 | Smith |
| 2007/0124536 A1 | 5/2007 | Carper |
| 2007/0154018 A1 | 7/2007 | Watanabe |
| 2007/0186106 A1 | 8/2007 | Ting |
| 2007/0194131 A1 | 8/2007 | Brown |
| 2007/0220273 A1 | 9/2007 | Campisi |
| 2007/0251997 A1 | 11/2007 | Brown |
| 2008/0005425 A1 | 1/2008 | Saito |
| 2008/0016370 A1 | 1/2008 | Libin |
| 2008/0019578 A1 | 1/2008 | Saito et al. |
| 2008/0040615 A1 | 2/2008 | Carper et al. |
| 2008/0054875 A1 | 3/2008 | Saito |
| 2008/0072065 A1 | 3/2008 | Bonalle et al. |
| 2008/0097924 A1 | 4/2008 | Carper et al. |
| 2008/0126260 A1 | 5/2008 | Cox |
| 2008/0148059 A1 | 6/2008 | Shapiro |
| 2008/0164325 A1 | 7/2008 | Borracci |
| 2008/0201658 A1 | 8/2008 | Saito et al. |

(56) References Cited

U.S. PATENT DOCUMENTS

| | | |
|---|---|---|
| 2008/0223921 A1 | 9/2008 | Salazar et al. |
| 2008/0223925 A1 | 9/2008 | Saito et al. |
| 2008/0230613 A1 | 9/2008 | Leibenguth |
| 2008/0282334 A1 | 11/2008 | Yves |
| 2009/0084858 A1 | 4/2009 | Borracci |
| 2009/0094125 A1 | 4/2009 | Killian et al. |
| 2009/0313493 A1 | 12/2009 | Ide |
| 2009/0322477 A1 | 12/2009 | Celorio |
| 2010/0039234 A1 | 2/2010 | Soliven et al. |
| 2010/0080425 A1 | 4/2010 | Bebis |
| 2010/0148312 A1 | 6/2010 | Jung |
| 2010/0153451 A1* | 6/2010 | Delia ............... G06F 21/316 707/781 |
| 2010/0161488 A1 | 6/2010 | Evans |
| 2010/0215224 A1 | 8/2010 | Saito |
| 2010/0257359 A1 | 10/2010 | Currie |
| 2010/0260388 A1 | 10/2010 | Garrett |
| 2010/0275259 A1 | 10/2010 | Adams |
| 2011/0238540 A1* | 9/2011 | Carrington ........ G06Q 20/04 705/30 |
| 2011/0256832 A1 | 10/2011 | Park |
| 2012/0016798 A1 | 1/2012 | Carper |
| 2012/0022957 A1* | 1/2012 | Sun ................. G06Q 20/085 705/16 |
| 2012/0079273 A1 | 3/2012 | Bacchiaz et al. |
| 2012/0120013 A1 | 5/2012 | Kurz |
| 2012/0218079 A1 | 8/2012 | Kim |
| 2012/0241524 A1 | 9/2012 | Blot et al. |
| 2012/0297467 A1 | 11/2012 | Carper |
| 2012/0313754 A1 | 12/2012 | Bona |
| 2013/0026230 A1 | 1/2013 | Cannon et al. |
| 2013/0036463 A1 | 2/2013 | Shashidhar |
| 2013/0056540 A1 | 3/2013 | Blot et al. |
| 2013/0080788 A1 | 3/2013 | Bacchiaz et al. |
| 2013/0290136 A1 | 10/2013 | Sheets |
| 2014/0006277 A1 | 1/2014 | Rao |
| 2014/0046785 A1 | 2/2014 | Jenkins |
| 2014/0232526 A1 | 8/2014 | Carper |
| 2014/0251997 A1 | 9/2014 | Bitton |
| 2015/0067348 A1 | 3/2015 | Webber |
| 2015/0127553 A1 | 5/2015 | Sundaram |
| 2015/0262170 A1* | 9/2015 | Bouda ............... G06Q 20/00 705/67 |
| 2015/0379033 A1* | 12/2015 | Agarwal ........ G06F 17/30106 707/703 |
| 2016/0191512 A1 | 6/2016 | Tatourian |
| 2017/0170513 A1 | 6/2017 | Sakamoto |
| 2017/0323130 A1 | 11/2017 | Dickinson |

FOREIGN PATENT DOCUMENTS

| | | |
|---|---|---|
| AU | 2003274967 A1 | 4/2004 |
| AU | 2004218720 B2 | 11/2004 |
| AU | 784438 B2 | 4/2006 |
| AU | 2006311596 A1 | 5/2007 |
| AU | 2007229728 A1 | 10/2007 |
| AU | 2010224455 A1 | 1/2011 |
| CA | 2346592 A1 | 11/2001 |
| CA | 2498288 A1 | 3/2004 |
| CA | 2564707 A1 | 11/2005 |
| CA | 2629435 A1 | 5/2007 |
| CA | 2748563 A1 | 3/2012 |
| CA | 2844003 A1 | 2/2013 |
| DE | 60111892 T2 | 8/2005 |
| DE | 10393215 T5 | 9/2005 |
| EP | 994439 A2 | 4/2000 |
| EP | 1256908 A1 | 11/2002 |
| EP | 1418486 | 5/2004 |
| EP | 1537526 | 6/2005 |
| EP | 1157906 A2 | 7/2005 |
| EP | 1647942 A2 | 4/2006 |
| EP | 1716660 | 11/2006 |
| EP | 1759337 | 3/2007 |
| EP | 1840788 | 10/2007 |
| EP | 1924976 | 5/2008 |
| EP | 1952244 | 8/2008 |
| EP | 2290625 A1 | 3/2011 |
| EP | 2434462 A1 | 3/2012 |
| EP | 2569735 B1 | 3/2013 |
| FR | 2953619 A1 | 6/2011 |
| FR | 2959847 A1 | 11/2011 |
| GB | 2473283 A | 3/2011 |
| JP | 02088859 | 3/1990 |
| JP | H0288859 | 3/1990 |
| JP | 02118790 A | 5/1990 |
| JP | 11039483 A | 2/1999 |
| JP | 2001250064 A | 9/2001 |
| JP | 2001323691 A | 11/2001 |
| JP | 2002183706 A | 6/2002 |
| JP | 2005242650 A | 9/2005 |
| JP | 2005326995 A | 11/2005 |
| JP | 2006257871 A | 9/2006 |
| JP | 200748118 | 2/2007 |
| JP | 2007048118 | 2/2007 |
| JP | 2007058649 | 3/2007 |
| JP | 2007156785 A | 6/2007 |
| JP | 2008078820 A | 4/2008 |
| JP | 2010262586 | 11/2010 |
| JP | 2011090686 A | 5/2011 |
| JP | 2012074011 A | 4/2012 |
| KR | 20030042639 | 6/2003 |
| WO | 9718653 | 5/1997 |
| WO | 2001016707 A1 | 3/2001 |
| WO | 2001016759 A1 | 3/2001 |
| WO | 2001016865 A1 | 3/2001 |
| WO | 2001016873 A1 | 3/2001 |
| WO | 2001016874 A1 | 3/2001 |
| WO | 2001039427 A1 | 3/2001 |
| WO | 2004025545 A2 | 3/2004 |
| WO | 2005104704 A1 | 11/2005 |
| WO | 2006102625 A2 | 9/2006 |
| WO | 2007022423 A2 | 2/2007 |
| WO | 2007056476 A2 | 5/2007 |
| WO | 2007064429 A1 | 6/2007 |
| WO | 2007143670 A2 | 12/2007 |
| WO | 2007146681 A2 | 12/2007 |
| WO | 2008010899 A2 | 1/2008 |
| WO | 2008079491 A2 | 7/2008 |
| WO | 2010019961 A2 | 2/2010 |
| WO | 2010077999 A2 | 7/2010 |
| WO | 2010133469 | 11/2010 |
| WO | 2010133496 A1 | 11/2010 |
| WO | 2011067543 A1 | 6/2011 |
| WO | 2011141659 A2 | 11/2011 |

OTHER PUBLICATIONS

Noore, Afzel, "Highly Robust Biometric Smart Card Design," IEEE Transactions on Consumer Electronics, Nov. 2000, pp. 1059-1063, vol. 46, No. 4.

Sanchez-Reillo, Raul, et al., "Fingerprint Verification Using Smart Cards for Access Control Systems," 2001, pp. 250-253.

Sanchez-Reillo, Raul, et al., "Microprocessor Smart Cards with Fingerprint User Authorization," IEEE AESS Systems Magazine, Mar. 2003, pp. 22-24.

Sung, Bum Pan, et al., "An Ultra-Low Memory Fingerprint Matching Algorithm and Its Implementation on a 32-bit Smart Card," IEEE, Mar. 26, 2003, pp. 453-459.

Kim, Dong-Sun, "On the Design of an Embedded Biometric Smart Card Reader," IEEE, Apr. 16, 2008, pp. 573-577.

Kim, Seong-Jin, "A CMOS Fingerprint System-on-a-Chip With Adaptable Pixel Networks and Column-Parallel Processors for Image Enhancement and Recognition," IEEE Journal of Solid-State Circuits, Nov. 2008, pp. 2558-2567, vol. 43, No. 11.

Nixon, Jenny, "Reconciling your Quicken Account with the Bank Statement," University of Nebraska, Lincoln, 2005.

"Biometric Technology for Secure Access," Sep. 18, 2007, Biometric Associates, Inc., Baltimore, MD, USA.

Patent Cooperation Treaty, International Search Report for PCT/US2016/000026, May 6, 2016, pp. 4-5.

(56) References Cited

OTHER PUBLICATIONS

Patent Cooperation Treaty, International Search Report for PCT/US2016/000020, May 12, 2016, pp. 4-5.
Anonymous: "ISO/IEC 7816-3 Identification cards—Integrated circuit cards—Part 3: Cards with contacts—Electrical interface and transmission protocols", Nov. 1, 2006 (Nov. 1, 2006), XP055438640, Retrieved from the Internet: URL:http://read.pudn.com/downloads132/doc/comm/563504/ISO-IEC 7816/ISO+IEC7816-3-2006.pdf [retrieved on Jan. 8, 2018].
Patent Cooperation Treaty, International Search Report for PCT/IB2016/000048, dated Apr. 15, 2016, p. 5.
ISO 7816 Part 3: Electronic Signals and Transmission Protocols, www.cardwerk.com/smartcards/smartcard_standard_ISO7816-3.aspx, Jan. 12, 2015 (11 pages).
John Fenske, "Biometrics Move to Smart Cards and Smartphones for Access Control", John Fenske, Jul. 30, 2013 (4 pages).
Patent Cooperation Treaty, International Search Report for PCT/IB2016/000324, dated Oct. 18, 2016, pp. 4-5.
Patent Cooperation Treaty, International Preliminary Report on Patentability PCT/IB2016/000020, dated Jul. 18, 2017, p. 4.
Patent Cooperation Treaty, International Preliminary Report on Patentability for PCT/IB2016/000048, dated Apr. 26, 2016, p. 4.
Patent Cooperation Treaty, International Search Report for PCT/IB2016/00093, dated Sep. 5, 2017, p. 7.
Patent Cooperation Treaty, International Preliminary Report on Patentability for PCT/IB2016/000093, dated Sep. 26, 2017, p. 4.
Patent Cooperation Treaty, International Preliminary Report on Patentability for PCT/IB2016/000026, dated Jul. 18, 2017, p. 4.
Patent Cooperation Treaty, International Preliminary Report on Patentability for PCT/IB2016/000324, dated Sep. 26, 2017, p. 4.
Patent Cooperation Treaty, International Preliminary Report on Patentability for PCT/IB2016/000048, dated Jul. 25, 2017, p. 4.
Patent Cooperation Treaty, International Search Report for PCT/IB2016/00020, dated May 24, 2017, pp. 2-3.

* cited by examiner

SYSTEM AND METHOD FOR RECONCILING ELECTRONIC TRANSACTION RECORDS FOR ENHANCED SECURITY

CROSS-REFERENCE TO RELATED APPLICATIONS

The present application is related to concurrently filed U.S. patent application Ser. No. 14/596,508, filed Jan. 14, 2015 entitled "System and Method for Requesting Reconciliation of Electronic Transaction Records for Enhanced Security"; U.S. patent application Ser. No. 14/596,472, filed Jan. 14, 2015 entitled "System and Method for Comparing Electronic Transaction Records for Enhanced Security"; and U.S. patent application Ser. No. 14/596,572, filed Jan. 14, 2015 entitled "Smart Card Systems Comprising a Card and a Carrier," the disclosures of which are incorporated herein by reference.

FIELD OF THE INVENTION

The present invention relates to electronic transactions. More specifically, the present invention relates to systems and methods for reconciling electronic transaction records for enhanced security.

BACKGROUND

Electronic transactions—such as for payments or access to a facility or computer—can be conducted using electronic portable transaction devices, such as smart cards or mobile devices. A smart card is a device that includes an embedded integrated circuit chip that can be either a secure processing module (e.g., microprocessor, microcontroller or equivalent intelligence) operating with an internal or external memory or a memory chip alone. Smart cards can provide identification, authentication, data storage, and application processing. Smart cards can serve as credit or ATM debit cards, phone or fuel cards, and high-security access-control cards for granting access to a computer or a physical facility. Smart cards can authenticate identity of the user by employing a token, such as public key infrastructure (PKI) and one-time-password (OTP). In addition, smart cards can be configured for a biometric authentication to provide an additional layer of security.

Similarly, mobile devices such as smartphones, PDAs, tablets, and laptops can provide a platform for electronic transactions. For example, a user of a mobile device can conduct an electronic transaction for purchase of a product or service using an application that communicates with a mobile payment service. Mobile devices can be configured for a token-based authentication and/or a biometric authentication.

These methods, however, are not immune to identity theft. For example, an identity thief can potential steal a token associated with a smart card or a mobile device and use the token to conduct a fraudulent transaction. What is needed is an additional layer of security that can eliminate or reduce risk for such a fraudulent transaction.

BRIEF SUMMARY OF THE INVENTION

Various embodiments of the present disclosure are directed to enhancing security of electronic transactions through reconciliation of prior electronic transactions.

In accordance with the technology described herein, a method of enhancing security of an electronic transaction comprises receiving a request for an authentication of an electronic portable transaction device in connection with a new electronic transaction involving the electronic portable transaction device; retrieving a first record of one or more previous electronic transactions involving the electronic portable transaction device from a first storage device; retrieving a second record of one or more previous electronic transactions involving the electronic portable device from a second storage device; and determining whether the first record and the second record are reconcilable.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF SEVERAL VIEWS OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

DETAILED DESCRIPTION

The present disclosure addresses this and other problems associated with electronic transactions by providing a procedure for authenticating an electronic portable transaction device based on reconciliation of previous transaction records (hereinafter "reconciliation-based authentication procedure"). A first record of one or more previous transactions involving the electronic portable transaction device is reconciled with a second record of one or more previous transactions involving the electronic portable transaction device.

In the following detailed description, numerous specific details are set forth to provide a full understanding of various aspects of the subject disclosure. It will be apparent, however, to one ordinarily skilled in the art that various aspects of the subject disclosure may be practiced without some of these specific details. In other instances, well-known structures and techniques have not been shown in detail to avoid unnecessarily obscuring the subject disclosure.

Figure 1:
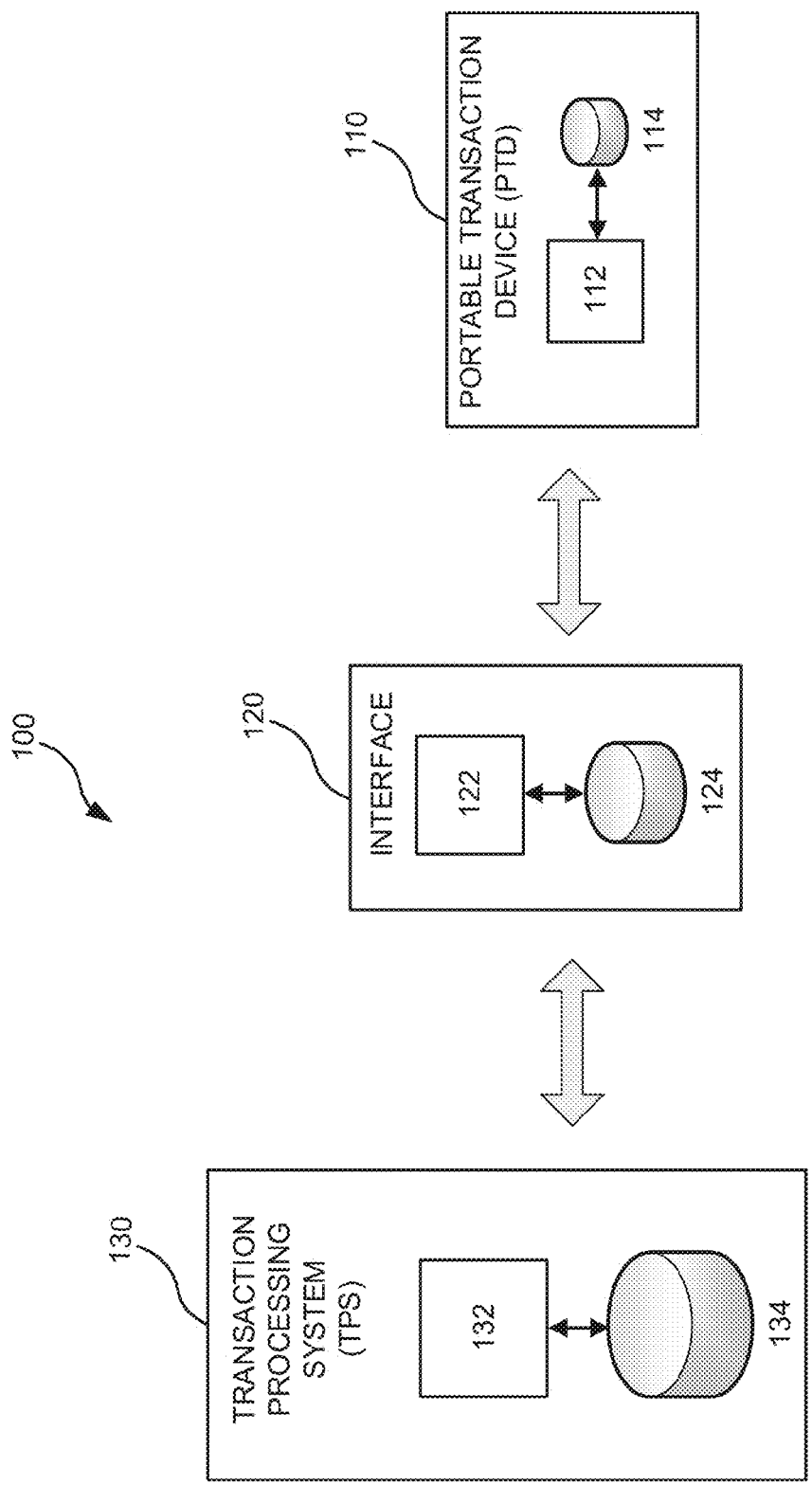
FIG. 1 is a block diagram of an example electronic transaction system within which various embodiments of the technology disclosed herein may be implemented.

FIG. 1 is a block diagram of an example electronic transaction system 100 that can implement a reconciliation-based authentication procedure according to certain aspects of the present disclosure. The system 100 includes an electronic portable transaction device (PTD) 110, a transaction processing system (TPS) 130, and an interface device 120 that facilitates communications between the PTD 110 and the TPS 130. The PTD 110 can be, for example, a smart card, a smart key, a smart fob, or a mobile device. In some embodiments, the PTD 110 can include a biometric authentication module (not shown) for biometric authentication.

The PTD 110 can conduct various types of electronic transactions with the TPS 130 via the interface device 120. For financial transaction applications, the PTD 110 can be a smart payment card such as a smart credit, debit, and/or prepaid card, or a smartphone with a payment transaction application. The TPS 130 can be a payment processing system of a merchant (e.g., Target®), a bank (e.g., Bank of America®), or a card issuer (e.g., Visa®). The interface device 120 can be a point of sale (POS) terminal that can communicate with the PTD 110 using a contact method (e.g., matching male and female contact pads) or a contactless method (e.g., RFID, Bluetooth, NFC, Wi-Fi, ZigBee).

For access control applications, the PTD 110 can be a smart access card for providing access to a facility or computer. The TPS 130 can be a server in a central computer system, or a dedicated access controller that controls an access to a facility or computer. Interface device 120 can be a card reader that can communicate with the PTD 110 using a contact method (e.g., contact pads) or a contactless method (e.g., RFID, Bluetooth, NFC, Wi-Fi, ZigBee).

In the illustrated example of FIG. 1, the PTD 110 includes a processing module 112 and a data storage device 114; the interface device 120 includes a processing module 122 and a data storage device 124; and the TPS 130 includes a processing module 132 and a data storage device 134. In some embodiments, the PTD 110 can include a biometric authentication module (not shown) that includes a biometric sensor and a controller. The processing modules 112, 122, and 132, depending on the application, may be a microprocessor, microcontroller, application-specific integrated circuit (ASIC), field-programmable gate array (FPGA), computer, server, or any combination of components or devices configured to perform and/or control the functions of the PTD 110, interface device 120, and TPS 130, respectively. The data storage devices 114, 124, and 134, depending on the application, may be a read-only memory (ROM), such as EPROM or EEPROM, flash, a hard disk, a database, or any other storage component capable of storing executory programs and information for use by the processing modules 112, 122, and 132, respectively.

Figure 2:
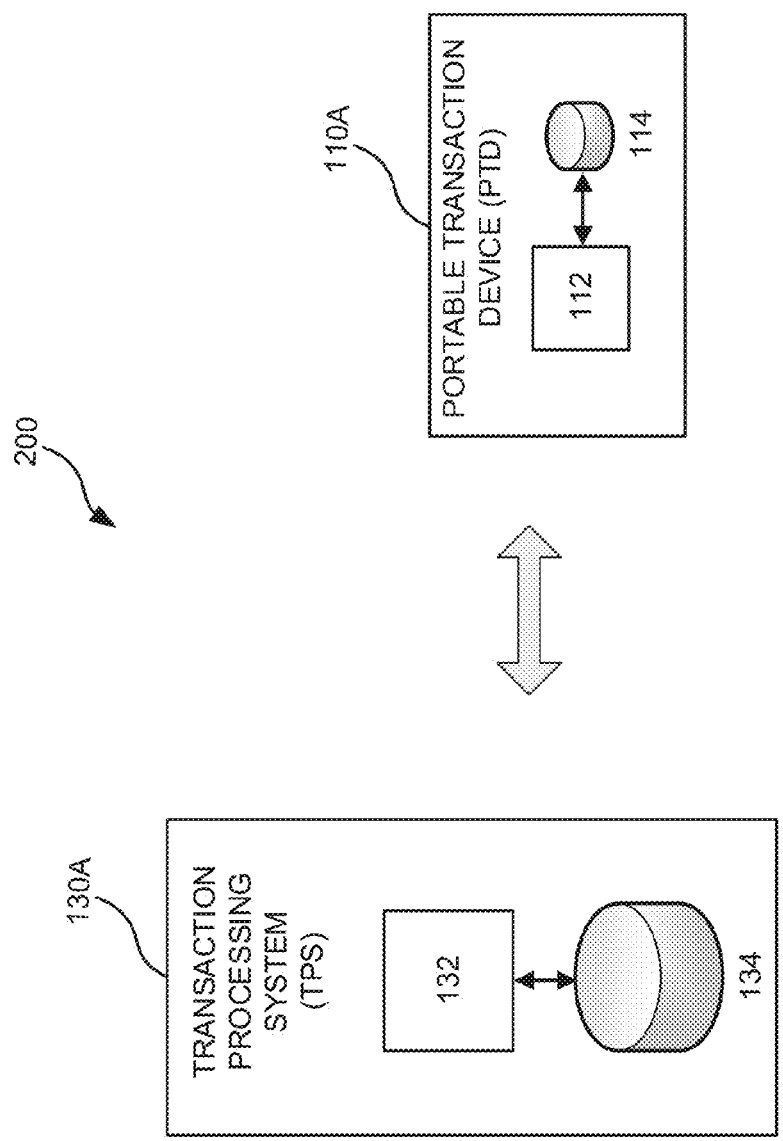
FIG. 2 is a block diagram of an example electronic transaction system implementing a reconciliation-based authentication procedure according to certain aspects of the present disclosure.

FIG. 2 is a block diagram of an example electronic transaction system 200 that implements a reconciliation-based authentication procedure according to certain aspects of the present disclosure As illustrated in FIG. 2, electronic transactions occur between a portable transaction device (PTD) 110A and a transaction processing system (TPS) 130A without an interface device. By way of example, a shopper may use a smartphone equipped with a camera to capture an image of a code (e.g., bar or QR code) to make a payment for a product or service by transmitting payment information to a card payment processing system via a cellular network. By way of another example, an access card reader at a facility may store information (e.g., passwords and/or security tokens) associated with employees authorized to enter the facility and, upon reading an access card, may compare security information received from the card with the stored information and grant or deny access depending on the outcome of the comparison.

In accordance with various aspects of the present disclosure, security of electronic transactions involving an electronic portable transaction device, such as a smart card or a mobile device, can be improved by providing a reconciliation-based authentication procedure before a new transaction involving the portable transaction device is authorized. With reference to FIG. 1, after completion of a financial or access control transaction involving the PTD 110, data items relating to the transaction may be stored in at least two of the data storage devices 112, 124, and 134 designated for storage of transaction records. In this manner, the designated storage devices can accumulate data items relating to previously completed transactions involving the PTD 110. By way of example, if the PTD 110 is a smart payment card used for purchase of products and the TPS 130 is a payment processing system, the memory 114 in the card 110 and the database 134 at the payment processing system 130 can store records of transaction-related data items, such as the tokens or passwords used, names and locations of the stores where the purchases were made, UPC codes of the products purchased, and/or times and amounts of the transactions. If the PTD 110 is a smart access card for a facility and TPS 130 is a central facility access controller, the memory 114 and the database 134 can store records of data items, such as the tokens and/or passwords used, the name of the facility (e.g., Warehouse #107), entry points (e.g., Southeast door #3), and/or times of the entries. If the PTD 110 is a smart access card for a computer or computer network, the memory 114 and the database 134 can store records of data items, such the tokens or passwords used, IDs of the computers or computer networks accessed, times and durations of the accesses, and/or the list of files and applications accessed.

In certain embodiments, the records of transaction-related data items stored in designated storage devices may be different. By way of example, in the smart payment card embodiment, the memory 114 at the PTD 110 may store security tokens, transaction times, and transaction amounts while the database 134 at the TPS 130 may store security tokens, store names and locations, and UPC codes of the products purchased. As long as there is at least one common data type stored in the designated storage devices (security token in this example), reconciliation of the transaction records can be performed.

In some embodiments, a reconciliation of a first record and a second record can include comparing a first set of one or more most-recent transactions in the first record stored in a first storage device with a second set of one or more most-recent transactions stored in a second storage device, and determining whether there is at least a predetermined number of matches between the two sets of most-recent transactions. In some embodiments, the first and second records are determined to be reconciled as long as there is at least one match between the two sets. In other embodiments, the first and second records are determined to be reconciled only if there are matches for all transactions in the two sets.

In some embodiments, a reconciliation of a first record and a second record can include comparing a first set of one or more previous transactions in the first record that satisfy certain predetermined criteria with a second set of one or more previous transactions in the second record that satisfy the same predetermined criteria, and determining whether there is at least a predetermined number of matches between the first set and the second set. In various embodiments, the predetermined criteria can include a minimum amount for a transaction. In this manner, the first and second sets being compared include only data items for which the amount of the transaction is greater than the minimum amount (e.g., $20). In various embodiments, the predetermined criteria can include transactions involving one or more entities (e.g., merchants, stores, banks, facilities, computer networks) that support the reconciliation-based authentication procedure.

Figure 3:
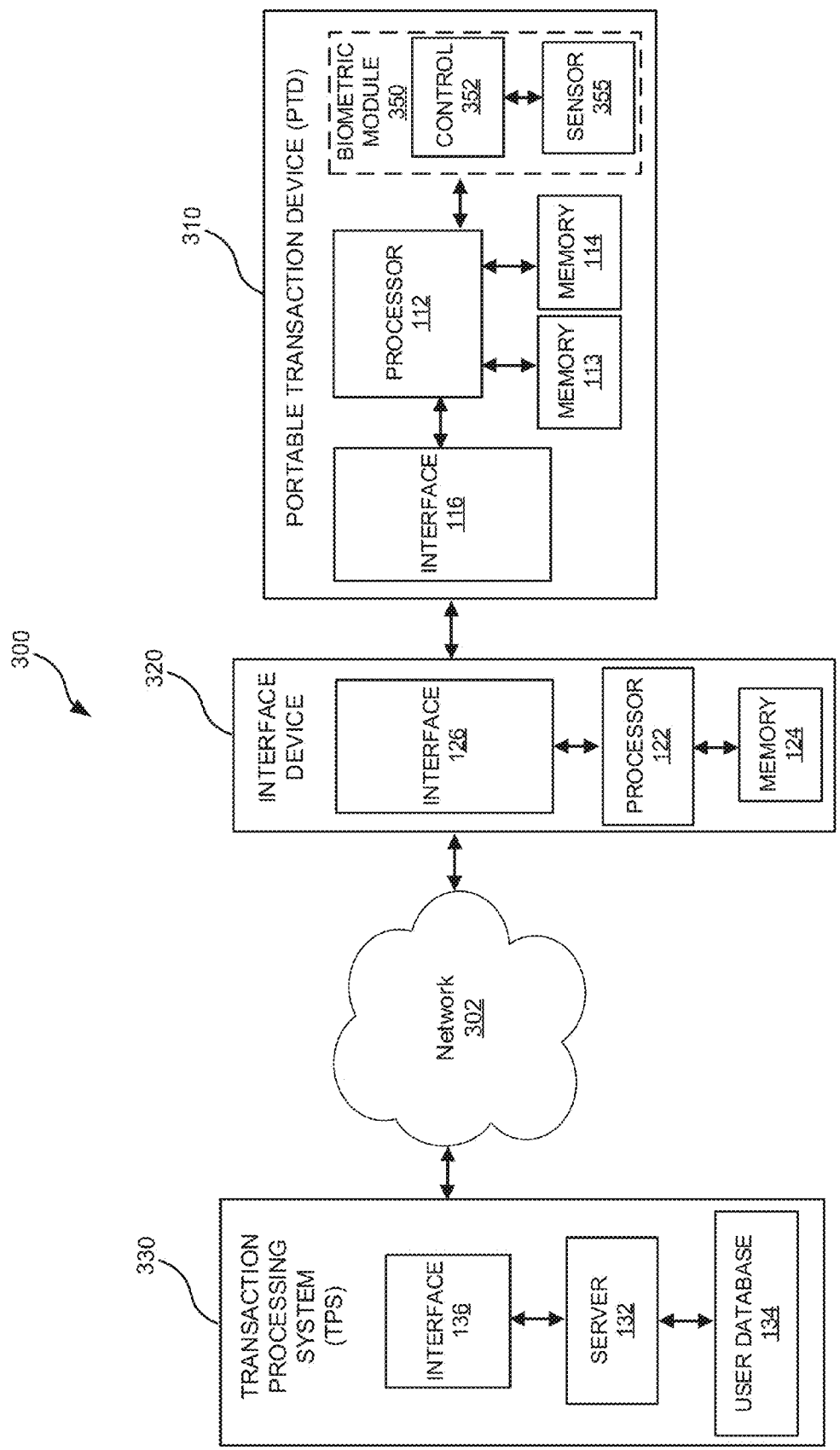
FIG. 3 is a block diagram of another example electronic transaction system implementing a reconciliation-based authentication procedure according to certain aspects of the present disclosure.

FIG. 3 is a block diagram of an example electronic transaction system 300 that can implement a reconciliation-based authentication procedure according to certain aspects of the present disclosure. In the illustrated example, the system 300 includes an electronic portable transaction device (PTD) 310, an interface device 320, and a transaction processing system (TPS) 330. In some embodiments, the PTD 310 is a smart card, in which case the interface device 320 can be a card reader. In some embodiments, the PTD 310 is a mobile device such as a smart phone, PDA, or tablet, in which case the interface device 320 can be an optical scanner or camera that can read a code presented on a display of the mobile device, or a Bluetooth, Wi-Fi or a near field communication (NFC) device that can communicate authentication- and/or transaction-related data between the mobile device and the TPS 330. In some embodiments, the PTD 310 is a smart card and the interface device 320 is a mobile device, in which case the smart card can perform authentication-related functions and the mobile device can provide a communication link between the smart card and the TPS 330.

In the illustrated embodiment of FIG. 3, the PTD 310 includes a processor 112, a first memory 113 and a second memory 114, and an interface 116. In certain embodiments, the first memory 113 can store a program that performs various communication and transaction functions of the PTD 310, and the second memory 114 can store a password, token, and/or other identification information unique to the PTD 310 and a record of previous transactions involving the PTD 310. In some embodiments, the first memory 113 and/or the second memory 114 can be part of the processor 112. In various embodiments, the first memory 113 and the second memory 114 may be a single memory component. The interface device 320 includes a processor 122, a memory 124, and an interface 126. The TPS 330 includes one or more processing modules including a server 132, one or more data storage devices including a user database 134, and an interface 136 for communicating with the interface device 320 via a communication network 302. In some embodiments, the user database 134 can store various data items relating to the PTD 310, including a password and data items relating to previously completed transactions involving the PTD 310.

The interface 116 and the interface 126 provide a communication link between the PTD 310 and the interface device 320. Using this communication link, the PTD 110 can communicate authentication- and/or transaction-related data with the interface device 120 and/or the TPS 130. In some embodiments, the PTD 110 can also receive power in the form of a voltage and/or current from the interface device 120 via the interfaces 116, 126. In certain embodiments, the interfaces 116, 126 can include a pair of male and female contact pads provided in the PTD (e.g., a smart card) and the interface device (e.g., a POS terminal). In some embodiments, the interfaces 116, 126 can include a pair of transceivers supporting wireless standards such as RFID, Bluetooth, Wi-Fi, NFT, and ZigBee. In some embodiments, the interface 116 can be a display of the mobile terminal that presents a code (e.g., a bar code or QR code) and the interface 126 can be an optical/infrared code scanner coupled to a POS terminal. In some embodiments, the interfaces 116,126 are a pair of wireless transceivers in a mobile device (e.g., a smartphone) and a POS terminal, respectively. In some embodiments, where the PTD 110 is a contactless smart card and the interface device 120 is a mobile device (e.g., a smartphone), the interfaces 116, 126 can include a pair of wireless transceivers in the contactless smart card and the mobile device, respectively.

In some embodiments, the PTD 110 is a mobile device that communicates with the TPS 130 via a wide area wireless network, such as a 3G UMTS or 4G LTE network, without the need for an interface device 120. In some embodiments, the PTD 110 is a smart card having a wireless capability that allows the card to communicate with the TPS 130 via a cellular network, such as a 3G UMTS or 4G LTE network, without the need for an interface device 120.

In certain embodiments, the processor 112 is configured to perform an authentication procedure using a security token stored in the first memory 113. Such a token-based authentication procedure is known in the art, and an exemplary procedure is described in "EMV® Payment Tokenisation Specification, Technical Framework" version 1.0, March 2014, which is incorporated herein by reference for all purposes.

In certain embodiments, the PTD 110 can include a biometric authentication module 350 that includes a control 352 and a biometric sensor 355. In other embodiments, the biometric authentication module 350 can be in the interface device (e.g., a POS terminal) instead of in the PTD 110. Biometric authentication can begin with the collection of a digital biometric sample (e.g., bitmap image of user's fingerprint) using the biometric sensor 355. Useful features contained in the collected sample are then extracted and formatted into a template record that can be matched against other template records. In various embodiments, the template is stored at registration (and when combined with identity vetting, establishes an identity) in a memory (not shown) inside the biometric authentication module 350 or in one of the first and second memories 113, 114. When a transaction takes place, the biometric sensor 355 can measure the same biometric characteristic and the control 352 can process the measured biometric characteristic into a template format, and compare the template to the previously registered template.

Biometric measurements may vary slightly from one measurement to the next. This variation is not typically due to changes in the biometric feature being measured but to the mechanism and environment in which the data are captured. Therefore, a biometric sample measured at registration may not precisely match the results of the live sample measurement. As a result of this variability, in various embodiments a similarity score is generated and this score is compared against a pre-determined threshold value to determine what constitutes an acceptable match.

As described above, various electronic transaction systems 100, 200, 300 of the present disclosure employ a reconciliation-based authentication procedure in addition to or in lieu of a token-based authentication procedure and a biometric authentication procedure. In embodiments that employ token-based and/or biometric-based authentication, a reconciliation-based authentication can be performed before, during, or after a token-based and/or biometric-based authentication to provide an extra layer of security.

With a reference to the embodiment of FIG. 3, in a reconciliation-based authentication procedure, one or more data items related to a transaction involving the PTD 310, such as for payment or access to a facility or computer, can be stored in the second memory 114 at the PTD 310 after completion of each transaction. In addition, one or more data items related to the same transaction are stored in a data storage device located outside the PTD 110 such as the user database 134 at the TPS 330 and/or the memory 124 at the interface device 320. When a user initiates a new transaction using the PTD 110, a first transaction record of one or more previous transactions stored in the second memory 114 at the PTD 110 and a second record of one or more previous transactions stored in a data storage outside the PTD 110 (e.g., the database 134 or the memory 124) are retrieved and compared. In some embodiments, the comparison of the first and second records is performed by the processing module 132 at the TPS 330. In other embodiments, the comparison is performed by the processing module 122 at the interface device 120. In some embodiments, the comparison is performed by the processing module 112 at the PTD 310. In some embodiments, the comparison can be performed by more than one device. For example, in an embodiment where the PTD 310 is a smart card (e.g., a smart payment card), the TPS 330 is a payment processing system, and the interface device 120 is a mobile terminal (e.g., a smartphone) that communicates with the smart card (using e.g., RFID, Bluetooth, NFC, Wi-Fi, or ZigBee) and the TPS 330 (using, e.g., a cellular network), the smart card can perform one comparison and the mobile terminal can perform another comparison as described further below with respect to FIG. 5.

In some embodiments, a reconciliation-based authentication procedure can be initiated by a device that is different from a device that performs the reconciliation (e.g., comparison of the first and second records). For example, the TPS 330 can send a request for a reconciliation-based authentication in connection with a new transaction involving the PTD 310. In some embodiments, the TPS 330 can also send a first record of one or more previous transactions involving the PTD 310 that are stored in the database 134. The processor 122 at the interface device 320 can receive the request and the first record from the TPS 330, retrieve a second record of one or more previous transactions involving the PTD 310 from the memory 114, and compare the first record and the second record for a match. In other embodiments, the interface device 320 passes the request and the first record received from the TPS 330 to the PTD 310, and the processor 112 at the PTD 310 receives the request and the first record from the interface device 320, retrieve a second record of one or more previous transactions stored in the second memory 114 and compare the first record to the second record for a match. In some embodiments where the PTD 310 (e.g., a smartphone) has the capability to communicate with a cellular network, such as a 3G UMTS or 4G LTE network, the PTD 310 can receive the request and the first record from the TPS 330 via the cellular network without involving an interface device such as a POS terminal.

In some embodiments, the PTD 310 can send a request for a reconciliation-based authentication in connection with a new transaction involving the PTD 310. The PTD 310 can also send a first record of one or more previous transactions involving the PTD 310 that are stored in the second memory 114. The processor 122 at the interface device 320 can receive the request and the first record from the PTD 310, retrieves a second record of one or more previous transactions involving the PTD 310 from the database 134 at the TPS 330, and compares the first record and the second record for a match. In other embodiments, the interface device 320 passes the request for authentication and the first record received from the PTD 310 to the TPS 330, and the processor (e.g., server) 132 at the TPS 330 receives the request and the first record from the interface device 320, retrieves a second record of one or more previous transactions involving the PTD 310 stored in the database 134 and compares the first record to the second record for a match. In some embodiments where the PTD 310 (e.g., a smartphone) has the capability to communicate with a cellular network, such as a 3G UMTS or 4G LTE network, the PTD 310 can send the request and the first record to the TPS 330 via the cellular network without involving an interface device such as a POS terminal.

In some embodiments, the interface device 320 can initiate a reconciliation-based authentication procedure by sending a request for the authentication to either the PTD 310 or the TPS 330. If the request is sent to the PTD 310, the processing module 122 at the interface device 320 can retrieve a first record of one or more previous electronic transactions involving the PTD 310 from the user database 134 at the TPS 330 and send the first record to the PTD 310. The processing module 112 at the PTD 310 can receive the request and the first record from the interface device 320, retrieve a second record of one or more previous transactions stored in the memory 114, and perform a comparison between the first and second records for a match. On the other hand, if the request is sent to the TPS 330, the processing module 122 at the interface device 320 can retrieve a first record of one or more previous electronic transactions involving the PTD 310 from the second memory 114 at the PTD 310 and send the first record to the TPS 330. The server 132 at the TPS 330 can receive the request and the first record from the interface device 320, retrieve a second record of one or more previous transactions involving the PTD 310 stored in the database 134, and perform a comparison between the first and second records for a match.

Figure 4:
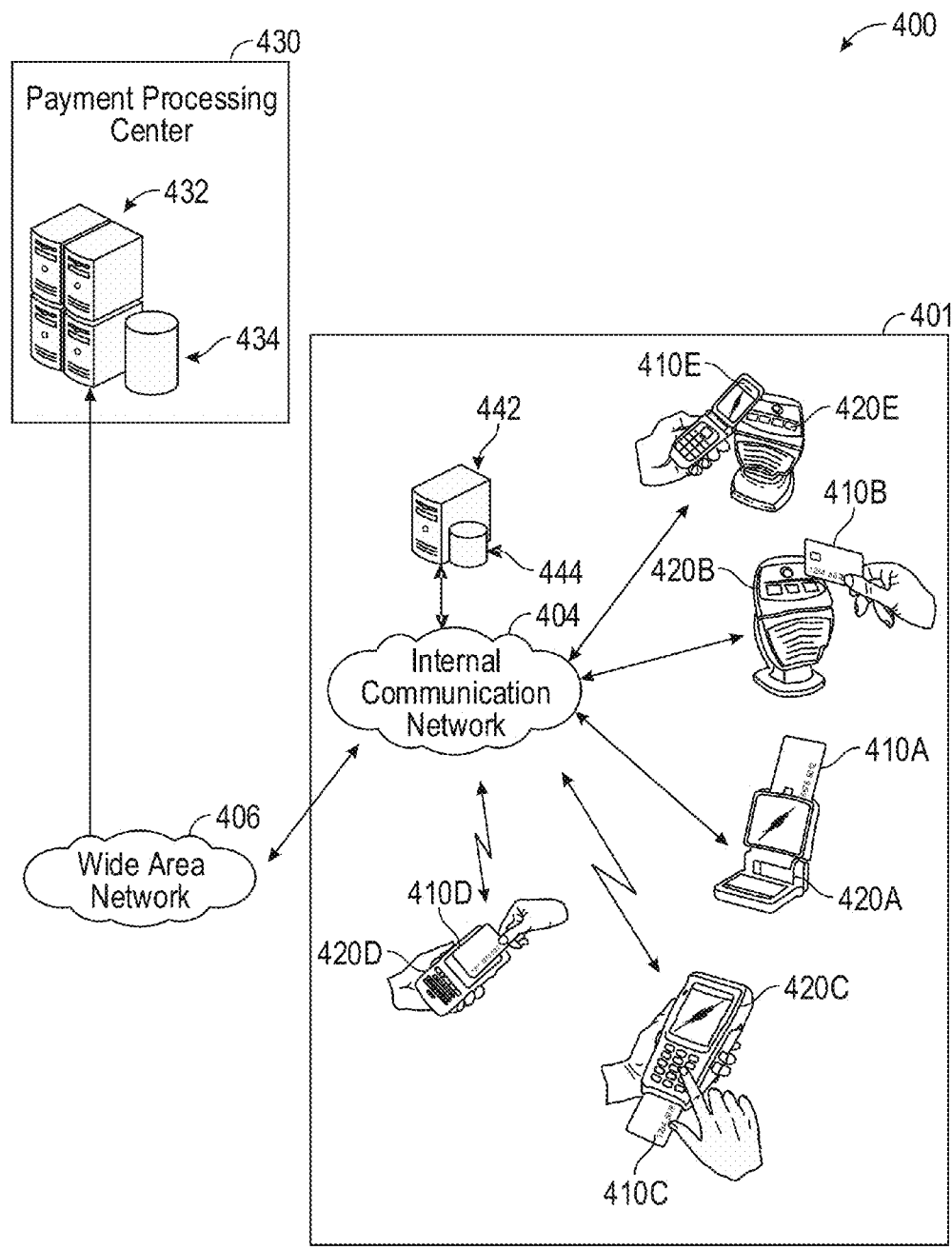
FIG. 4 is a block diagram of another example electronic transaction system implementing a reconciliation-based authentication procedure according to certain aspects of the present disclosure.

Various example arrangements of electronic transaction systems implementing a reconciliation-based authentication procedure are described below with respect to FIGS. 4-7. FIG. 4 depicts an example electronic payment transaction system 400 that implements a reconciliation-based authentication procedure according to certain aspects of the present disclosure. The system 400 includes a payment processing system 430 that includes one or more servers 432 and a user database 434 coupled to the servers 432. In some embodiments, the user database 434 can store various data items relating to card holders, including passwords and records of previously completed payment transactions. In various embodiments, the system 400 may include an internal or proprietary payment transaction system 401 of a merchant (e.g., Target®). Payment transaction system 401 may include various types of interface devices 420A-E that facilitate transaction-related communications between various types of portable payment transaction devices 410A-E and the server(s) 432 at the payment processing system 430. In the illustrated example, the portable payment transaction devices 410A-E are smart payment cards that can communicate with the interface devices 420A-E. Each of the portable payment transaction devices 410A-E can include all or some of the components 112, 113, 114, 116, 350, 352, and 355 of the PTD 310 depicted in FIG. 3. Each of the interface devices 420A-E can include all or some of the components 122, 124, and 126 of the interface device 320 depicted in FIG. 3. In the illustrated embodiment, the merchant's internal payment transaction system 401 further includes a server 442 and a database 444 that can store data items relating to the merchant's customers including passwords, tokens, and transaction records.

To enable communication between the payment processing system 430 and the merchant's internal payment transaction system 401, the interface devices 420A-E and the server 442 in the internal payment transaction system 401 have wired or wireless connections to an internal communication network 404 (e.g., Intranet), which is in turn connected a wide area network 406 (e.g., Internet). In this manner, the POS terminals 420A-E, the smart payment cards 410A-E, and the server 442 can engage in data communication with the server(s) 432 at the payment processing system 430.

In the illustrated example of FIG. 4, the interface device 420A is a fixed point of sale (POS) terminal that is configured to operate with a contact smart payment card 410A and has a wired connection (e.g., wired Ethernet) to the internal communication network 404. During a payment transaction, the contact smart payment card 410A is inserted into the POS terminal 420A for data communication. For this purpose, the contact smart payment card 410A can be equipped with male contact pads and the POS terminal 420A can be equipped with corresponding female contact pads or vice versa. Other methods of providing contact-based communication coupling between the contact smart payment card 410A and the POS terminal 420A, including micro connectors, can be utilized.

The interface device 420B is a fixed POS terminal that is configured to operate with a contactless smart payment card 410B and has a wired connection (e.g., wired Ethernet) to the internal communication network 404. During a payment transaction, the contactless smart payment card 410B is placed adjacent to the POS terminal 420B for wireless data communication. For this purpose, the contactless smart payment card 410B and the POS terminal 420B can be equipped with transceivers based on a wireless standard or technology, such as RFID, Bluetooth, NFC, Wi-Fi, and ZigBee.

The interface device 420C is a portable POS terminal that is configured to operate with a contact smart payment card 410C, and the portable POS terminal 420C has a wireless connection (e.g., wireless Ethernet) to the internal communication network 404. During a payment transaction, the contact smart payment card 410C is inserted into the portable POS terminal 420C for data communication. In various embodiments, the contact smart payment card 410C can be equipped with male contact pads and the POS terminal 420C can be equipped with corresponding female contact pads or vice versa. Other methods of providing contact-based communication coupling between the contact smart payment card 410C and the POS terminal 420C including, micro connectors, can be utilized.

The interface device 420D is a portable POS terminal that is configured to operate with a contactless smart payment card 410D, and POS terminal 420D has a wireless connection (e.g., wireless Ethernet) to the internal communication network 404. During a payment transaction, the contactless smart payment card 410D is placed adjacent to the portable POS terminal 420D for wireless data communication. For this purpose, the contactless smart payment card 410D and the POS terminal 420D can be equipped with transceivers based on a wireless standard or technology, such as RFID, Bluetooth, NFC, Wi-Fi, and ZigBee.

The interface device 420E is a fixed POS terminal that is configured to operate with a mobile device (e.g., a smartphone, PDA, tablet), and has either a wired connection (e.g., wired Ethernet) or a wireless connection (e.g., Wi-Fi) to the internal communication network 404. During a payment transaction, the mobile terminal 410E is placed adjacent to the POS terminal 420E for wireless data communication. For this purpose, the mobile terminal 410E and the POS terminal 420E can be equipped with transceivers based on a wireless standard or technology such as RFID, Bluetooth, NFC, Wi-Fi, and ZigBee. In certain alternative embodiments, the POS terminal 420E can have a wireless connection (e.g., wireless Ethernet) to the internal communication network 404. In some embodiments, the POS terminal 420E can be equipped with an optical scanner or camera that can read a code (e.g., bar code or QR code) displayed on a display of the mobile terminal 410E.

For ease of illustration only, without any intent to limit the scope of the present disclosure in any way, various aspects of operation of the electronic payment transaction system 400 will be described with respect to the contact smart payment card 410A and the POS terminal 420A. It shall be appreciated by those skilled in the art in view of the present disclosure that the described operation is applicable to other portable transaction devices (e.g., 410B-E) and interface devices (e.g., 420B-E).

In operation, a new transaction is initiated when a user presents the smart payment card 410A at the POS terminal 420A to pay for products and/or services by, for example, inserting the card 410A into the POS terminal 421 as shown in FIG. 4. Before authorizing the new transaction, one or more authentication procedures are performed to determine the authenticity of the smart payment card 410A and/or the identity of the user. For example, the card 410A in coordination with the POS terminal 420A and/or the payment processing system 432 can perform a token-based authentication procedure described above. Optionally, the card 410A, either by itself or in coordination with the POS terminal 420A and/or the payment processing system 432, can perform a biometric authentication procedure in addition to the token-based authentication procedure. To further enhance security of the transaction, the card 410A in coordination with the POS terminal 420A and/or the payment processing system 432 performs a reconciliation-based authentication procedure before, during, or after a token-based authentication and/or a biometric-based authentication.

In certain embodiments, the reconciliation-based authentication is performed at the payment processing system 430. By way of example, after making a data connection with the card 410A, the POS terminal 420A can retrieve (e.g., request and receive) a security token from the card 410A. The POS terminal 420A can also retrieve a first record of one or more previous transactions involving the card 410A from the memory 114. The POS terminal 420A can send a request for approval of the new transaction to the payment processing system 430 along with the security token and the first record retrieved from the card 410A. The server(s) 432 at the payment processing system 420 receives the request and the first record and performs an authentication with respect to the security token received from the POS terminal 420. Upon a successful token-based authentication, the server(s) 432 can perform a reconciliation-based authentication by determining whether the first record received from the POS terminal 420A can be reconciled with a second record of one or more previous transactions involving the card 410A stored in the user database 434.

In certain embodiments, the reconciliation-based authentication is performed at the POS terminal 420A. By way of example, after making a data connection with the card 410A, the POS terminal 420A can retrieve a security token and a first record of one or more previous transactions from the card 410A. The POS terminal 420A can send the security token to the payment processing system 430, and the server(s) 432 at the payment processing system 420 performs a token-based authentication. If the token-based authentication is successful, the server(s) 432 can retrieve a second record of one or more previous transactions involving the card 410A from the user database 434 and send the second record to the POS terminal 420A with an indication that the token-based authentication was successful. The processor 122 at the POS terminal 420A, upon receiving the second record, performs a reconciliation-based authentication by determining whether the first record received from the card 410A can be reconciled with the second record received from the payment processing system 430. In some embodiments, the POS terminal 420A can retrieve the second record from the database 444 in the merchant's internal payment transaction system 401 rather than from the database 434 at the payment processing system 430.

In certain embodiments, the reconciliation-based authentication is performed at the smart payment card 410A. By way of example, after making a data connection with the card 410A, the POS terminal 420A can retrieve a security token from the card 410A and send the security token to the payment processing system 430. The server(s) 432 at the payment processing system 420 performs a token-based authentication. If the token-based authentication is successful, the server(s) 432 retrieves a first record of one or more previous transactions involving the card 410A from the user database 434 and send the second record to the POS terminal 420A with an indication that the token-based authentication was successful. The POS terminal 420A, upon receiving the second record from the payment processing system, sends the second record to the card 410A. The processor 112 at the card 410A performs a reconciliation-based authentication by determining whether the first record received from the payment processing system 430 via the POS terminal 420A can be reconciled with a second record of one or more previous transactions stored in the memory 114 at the card 410A.

There can be many different ways of determining whether the first record and the second record are reconcilable. In certain embodiments, the reconcilability determination can involve comparing one or more transaction-related data items in the first record with one or more transaction-related data items in the second record and determining whether there is at least a predetermined number of matches. For example, security tokens and transaction times for the five (5) most-recent transactions in the first record can be compared to security tokens and transaction times for 5 most-recent transactions in the second record. If the comparison produces a number of matches that is equal to or greater than a predetermined number (e.g., 1-5 transactions matched), the first and second records are determined to be reconcilable and the new transaction is approved. On other hand, if the number of matches is less than the predetermined number, the first and second records are determined to be irreconcilable and the new transaction is denied.

In some embodiments, the reconcilability determination can involve comparing one or more previous transactions in the first record that satisfy certain criteria to one or more previous transactions in the second record that satisfy the same criteria. For example, one or more previous transactions in the first record that exceeded a predetermined transaction amount (e.g., $20) can be compared to one or more previous transactions in the second record that exceeded the same predetermined transaction amount. In this manner, small-amount transactions that do not require a reconciliation-based authentication are automatically excluded. By way of another example, one or more previous transactions in the first record that involved one or more specific entities (e.g., merchants, banks, or government agencies) can be compared to one or more previous transactions in the second record that involved the same entity or entities. For example, there can be a group of merchants that support or participate in a particular reconciliation-based authentication standard, although the smart payment card 410A can be used for transactions with other merchants that do not support the standard. In this example, only previous transactions from the first and second records that involved participating merchants are compared.

Figure 5:
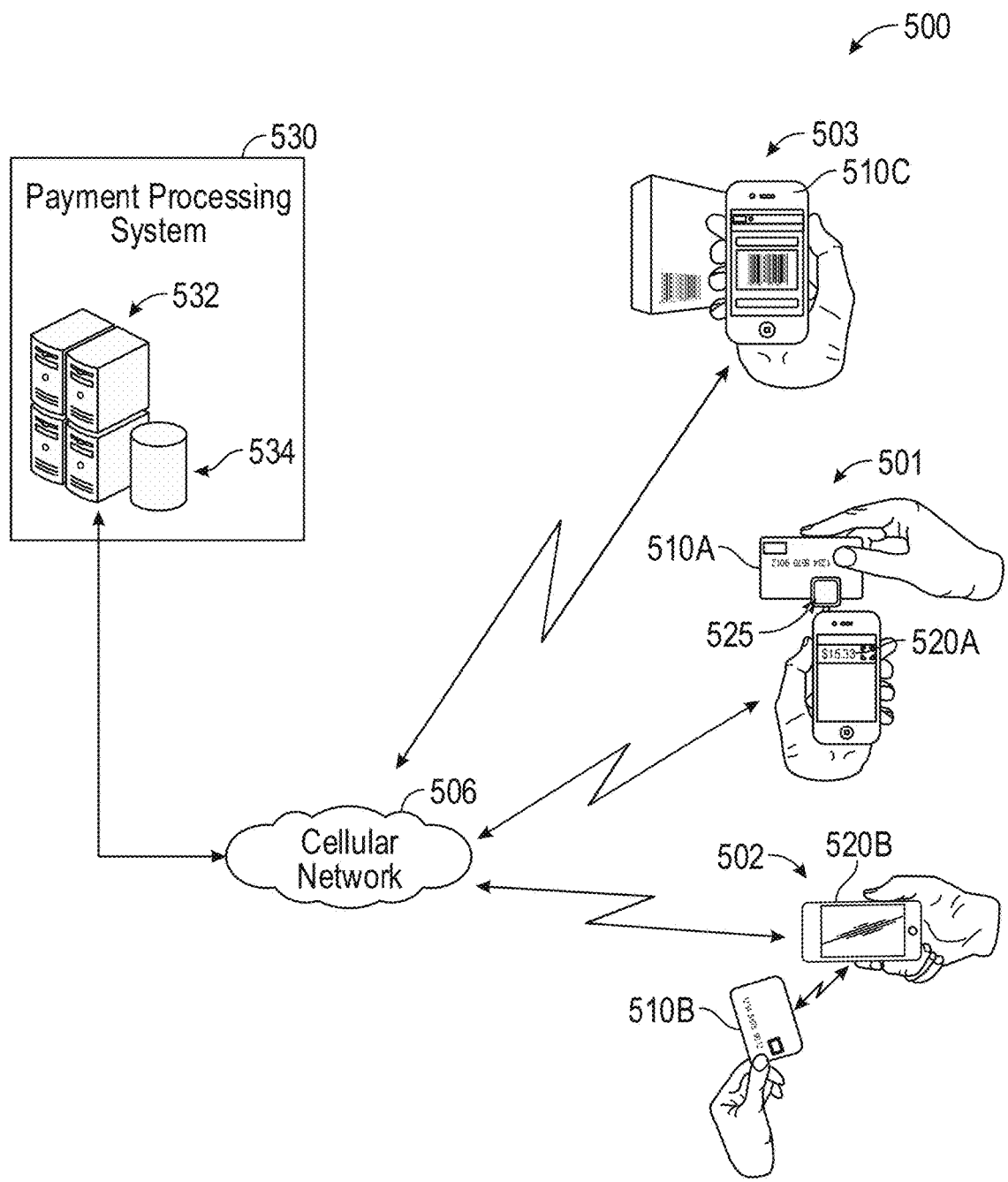
FIG. 5 is a block diagram of another example electronic transaction system implementing a reconciliation-based authentication procedure according to certain aspects of the present disclosure.

FIG. 5 depicts another example electronic payment transaction system 500 that implements a reconciliation-based authentication procedure according to certain aspects of the present disclosure. The system 500 includes a payment processing system 530 that includes one or more servers 532 and a user database 534 coupled to the server(s) 532. The sever(s) 532 conduct different types of electronic payment transactions 501, 502, 503 with mobile terminals 520A-C via a cellular network 506.

The first electronic payment transaction 501 involves a contact smart payment card 510A coupled to the mobile terminal 520A via a smart card reader 525 and conducting a payment transaction with the payment processing system 530 via the cellular network 506. The second electronic payment transaction 502 involves a contactless smart payment card 510B wirelessly coupled to the mobile terminal 520B and conducting a payment transaction with the payment processing system 530 via the cellular network 506. The third electronic payment transaction 503 involves the mobile terminal 510C as a portable transaction device and an interface device. In some embodiments, mobile terminal 510 can capture an image of a code (e.g., a bar or QR code) associated with a product printed on a package of the product, in a catalog, or advertisement using an image capture device (e.g., a camera) and conducting a payment transaction for the product with the payment processing system 530 via the cellular network 506.

In each of these payment transactions 501, 502, 503, a reconciliation-based authentication procedure similar to the reconciliation-based authentication procedures described above with respect to FIGS. 1-4 can be performed in addition to a token-based authentication and/or a biometric-based authentication for enhanced security. In the first payment transaction 501, reconciliation of a first record of one or more previous transactions involving the smart payment card 510A and a second record of one or more previous transactions involving the smart payment card 510A can be performed by the server(s) 532 at the payment processing system 530, a processor in the mobile terminal 520A, or a processor in the smart payment card 510A. The first record can be stored in a memory in the smart payment card 510A or in a memory in the mobile terminal 520A. The second record can be stored in the database 534 at the payment processing system 530 or in a memory in the mobile terminal 520A.

For the second payment transaction 502, reconciliation of a first record of one or more previous transactions involving the smart payment card 510B and a second record of one or more previous transactions involving the smart payment card 510B can be performed by server(s) 532 at the payment processing system 530, a processor in the mobile terminal 520B, or a processor in the smart payment card 510B. The first record can be stored in a memory in the smart payment card 510B or in a memory in the mobile terminal 520B. The second record can be stored in the database 534 at the payment processing system 530 or in a memory in the mobile terminal 520B.

For the third payment transaction 503, reconciliation of a first record of one or more previous transactions involving the mobile terminal 510C and a second record of one or more previous transactions involving the mobile terminal 510C can be performed by server(s) 532 at the payment processing system 530, or a processor in the mobile terminal 510C. The first record can be stored in a memory in the mobile terminal 510C, and the second record can be stored in the database 534.

In certain embodiments, multiple reconciliations (e.g. comparison of previous transactions for a match) can be performed by multiple devices. By way of example, in the first payment transaction 501, a processor in the smart payment card 510A can perform a first comparison of a first record of one or more previous transactions involving the card 510A retrieved from the database 534 at the payment transaction center 530 with a second record of one or more previous transactions involving the card 510A retrieved from a memory of the card 510A. In addition, a processor in the mobile terminal 520A can perform a second comparison of the first record of one or more previous transactions involving the card 510A retrieved from the database 534 at the payment transaction center 530 with a third record of one or more previous transactions retrieved from a memory of the mobile terminal 520A.

By way of another example of multiple reconciliations, the server 534 at the payment processing system 530 can perform a first comparison of a first record of one or more previous transactions involving the card 510A retrieved from the database 534 with a second record of one or more previous transactions involving the card 510A retrieved from a memory of the mobile terminal 520A. In addition, a processor in the smart payment card 510A can perform a second comparison of the first record of one or more previous transactions involving the card 510A retrieved from the database 534 at the payment transaction center 530 with a third record of one or more previous transactions retrieved from a memory of the card 510A. It shall be appreciated by those skilled in the art in view of the present disclosure that there are other configurations of devices and records for performing multiple reconciliations.

Figure 6:
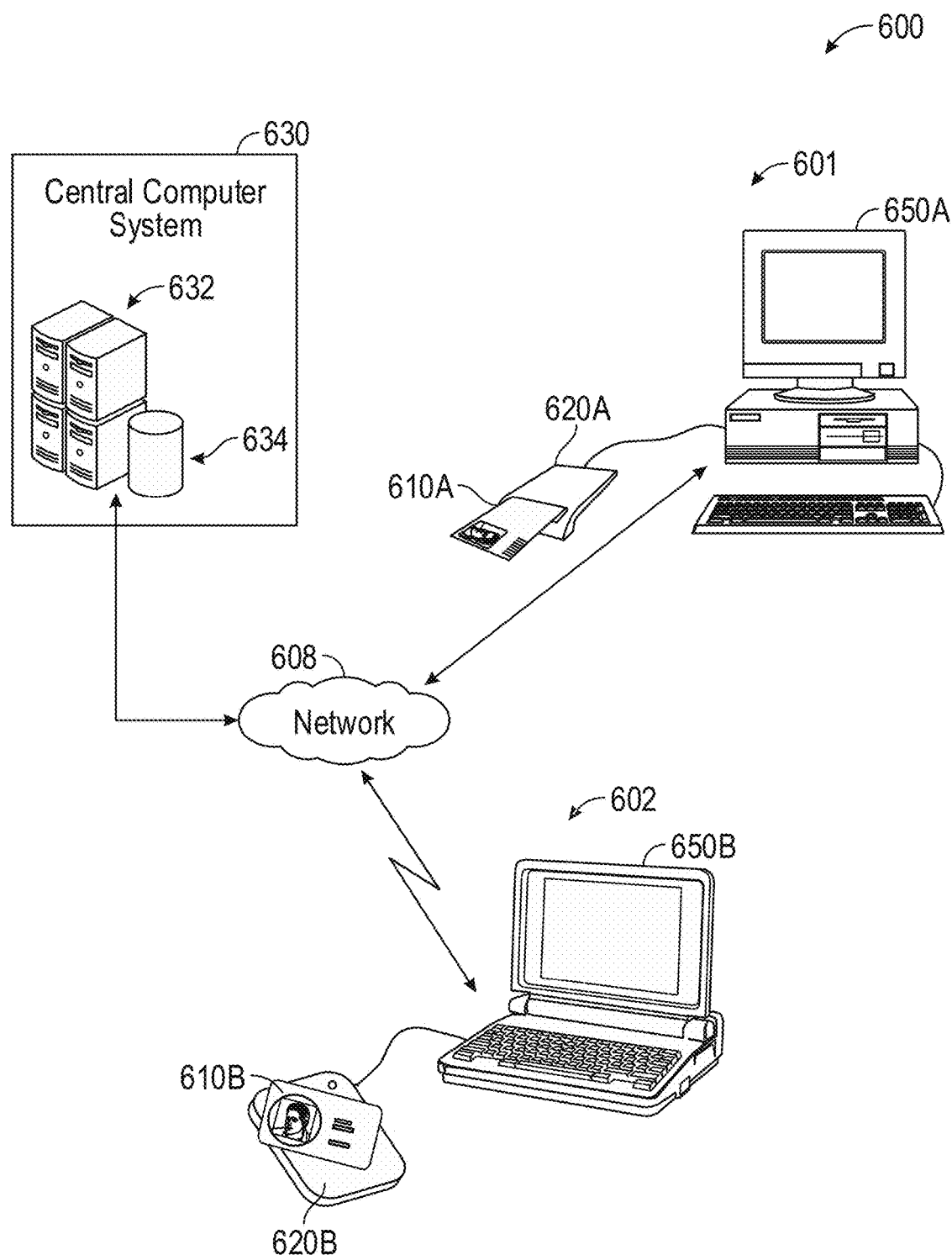
FIG. 6 is a block diagram of an example computer access control system implementing a reconciliation-based authentication procedure according to certain aspects of the present disclosure.

FIG. 6 depicts an exemplary computer access control system 600 that implements a reconciliation-based authentication procedure according to certain aspects of the present disclosure. FIG. 6 illustrates a first computer access transaction 601 involving a contact smart access card 610A and a card reader 620A, and a second computer access transaction 602 involving a contactless smart access card 610B and a card reader 620B. In the illustrated example, the system 600 further includes a central computer system 630 that includes one or more servers 632 and a database 634 coupled to the server(s) 632. The sever(s) 632 is connected to the computers 650A, 620B via a network 608, which can be a local area network (LAN) or a wide area network (WAN). In certain embodiments, the system 600 can allow a first group of users to access files and applications stored in and running on the computers 650A, 650B and allow a second group of users to access files and applications stored in and running on the computers 650A, 650B and the server(s) 632 and the database 634 in the central computer system 630.

In the first computer access transaction 601, a user can insert a contact smart access card 610A into a card reader 620A coupled to the desktop computer 650A for access to the desktop computer 650A and/or the central computer system 632. In the illustrated example, the desktop computer 650A is coupled to the network 608 via a wired connection. In the second computer access transaction 602, a user can place a contactless smart access card 610B adjacent to a card reader 620B coupled to a laptop computer 650B for access to the laptop computer 650B and/or the server(s) 632 and the database 634 in the central computer system 630. The laptop computer 650B is coupled to the network 608 via a wireless connection.

In each of these computer access transactions 601, 602, a reconciliation-based authentication procedure similar to the reconciliation-based authentication procedures described above with respect to FIGS. 1-4 can be performed in addition to a token-based authentication and/or a biometric-based authentication for enhanced security. For the first computer access transaction 601, a reconciliation (e.g., comparison) of a first record of one or more previous transactions involving the smart access card 610A and a second record of one or more previous transactions involving the smart access card 610A can be performed by server(s) 632 at the central computer system 630, a processor in the card reader 620A, a processor in the smart access card 610A, or a processor in the desktop computer 650A. The first record can be stored in a memory in the smart access card 610A, and the second record can be stored in the database 634 or in a memory in the desktop computer 650A. For the second computer access transaction 602, a reconciliation (e.g., comparison) of a first record of one or more previous transactions involving the smart access card 610B and a second record of one or more previous transactions involving the smart access card 610B can be performed by server(s) 632 at the central computer system 630, a processor in the card reader 620B, a processor in the smart access card 610B, or a processor in the laptop computer 650B. The first record can be stored in a memory in the smart access card 610B, and the second record can be stored in the database 634 or in a memory in the laptop computer 650B. In certain embodiments, a dedicated computer access controller (not shown) can be employed to control access to the computers 650A, 650B and/or the central computer system 630, a processing module (e.g., a processor) in the controller can perform one or more of a token-based authentication, a biometric-based authentication, and a reconciliation-based authentication, and a data storage device (e.g., a memory) in the controller can store records of computer access transactions for different users.

Figure 7:
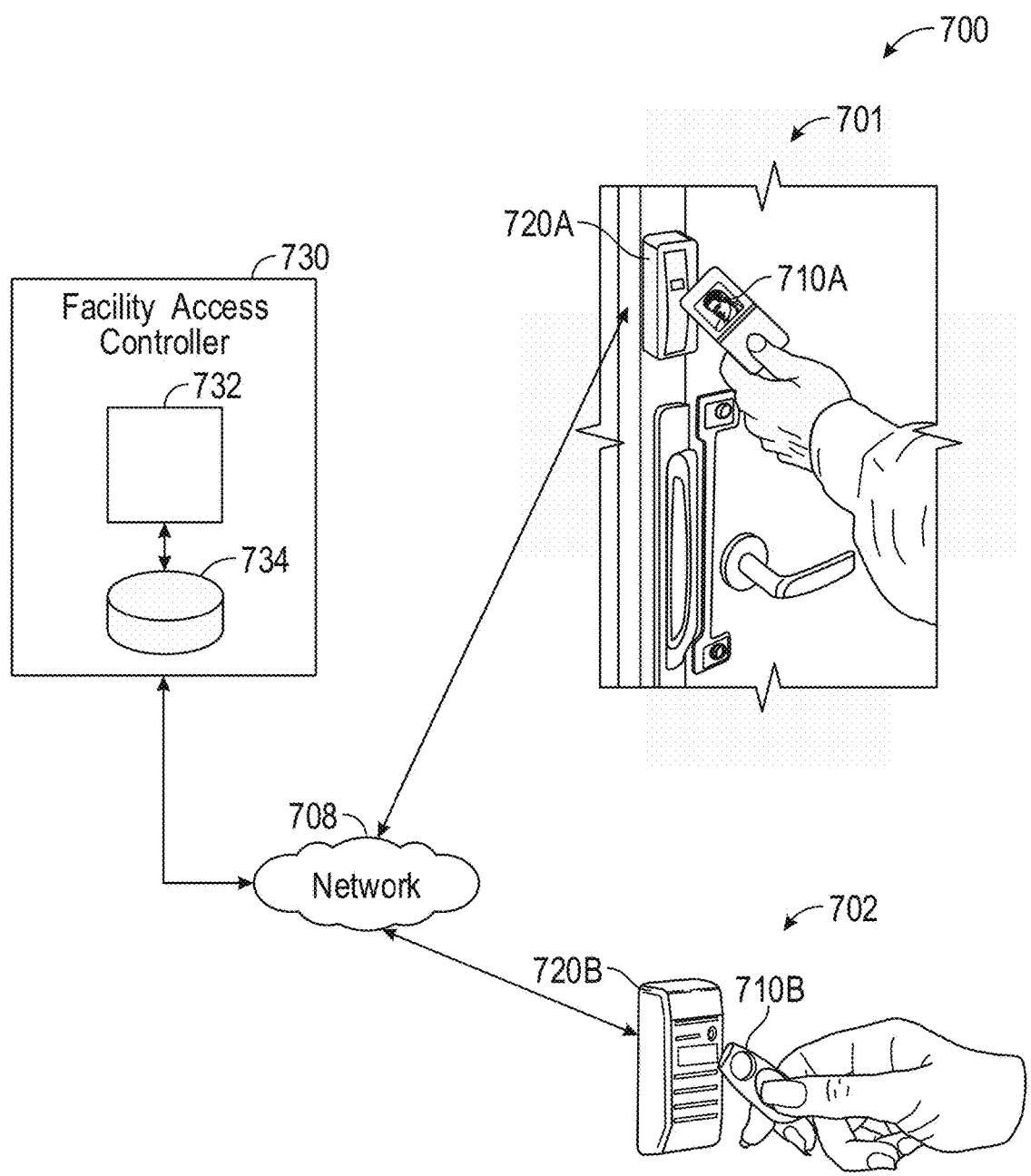
FIG. 7 is a block diagram of an example facility access control system implementing a reconciliation-based authentication procedure according to certain aspects of the present disclosure.

FIG. 7 depicts an exemplary facility access control system 700 that implements a reconciliation-based authentication procedure according to certain aspects of the present disclosure. FIG. 7 illustrates a first facility access transaction 710 involving a smart access card 710A and a card reader 720A, and a second facility access transaction 720 involving a smart access fob 710B and a fob reader 720B. In the illustrated example, the system 700 further includes a central facility access controller 730 that includes a processing module 732 and a data storage 734 coupled to the processing module 732. The processing module 732 is communicatively connected to the card reader 720A and the fob reader 620B via a communication network 708, which can be a local area network (LAN) or a wide area network (WAN).

In the first facility access transaction 701, a user presents the smart access card 710A to the card reader 720B to gain access to a facility. The card reader 720B can communicate with the card 710A using one of various contact or contactless methods, including non-limiting examples described above. In the second facility access transaction 702, a user presents the smart access fob 710A to the fob reader 720B to gain access to the facility.

In each of these facility access transactions 701, 702, a reconciliation-based authentication procedure similar to the reconciliation-based authentication procedures described above with respect to FIGS. 1-4 can be performed in addition to a token-based authentication and/or a biometric-based authentication for enhanced security. For the first facility access transaction 701, a reconciliation (e.g., comparison) of a first record of one or more previous transactions involving the smart access card 710A and a second record of one or more previous transactions involving the same smart access card 710A can be performed by the processing module 732 at the central facility access controller 730, a processor in the card reader 720A, or a processor in the smart access card 710A. The first record can be stored in a memory in the smart access card 710A, and the second record can be stored in the database 734 or in a memory in the card reader 730A. For the second facility access transaction 702, a reconciliation (e.g., comparison) of a first record of one or more previous transactions involving the smart access fob 710B and a second record of one or more previous transactions involving the same smart access fob 710B can be performed by the processing module 732 at the central facility access controller 730, a processor in the fob reader 720B, or a processor in the smart access fob 710B. The first record can be stored in a memory in the smart access fob 710B, and the second record can be stored in the database 734 or in a memory in the fob reader 720B.

Figure 8:
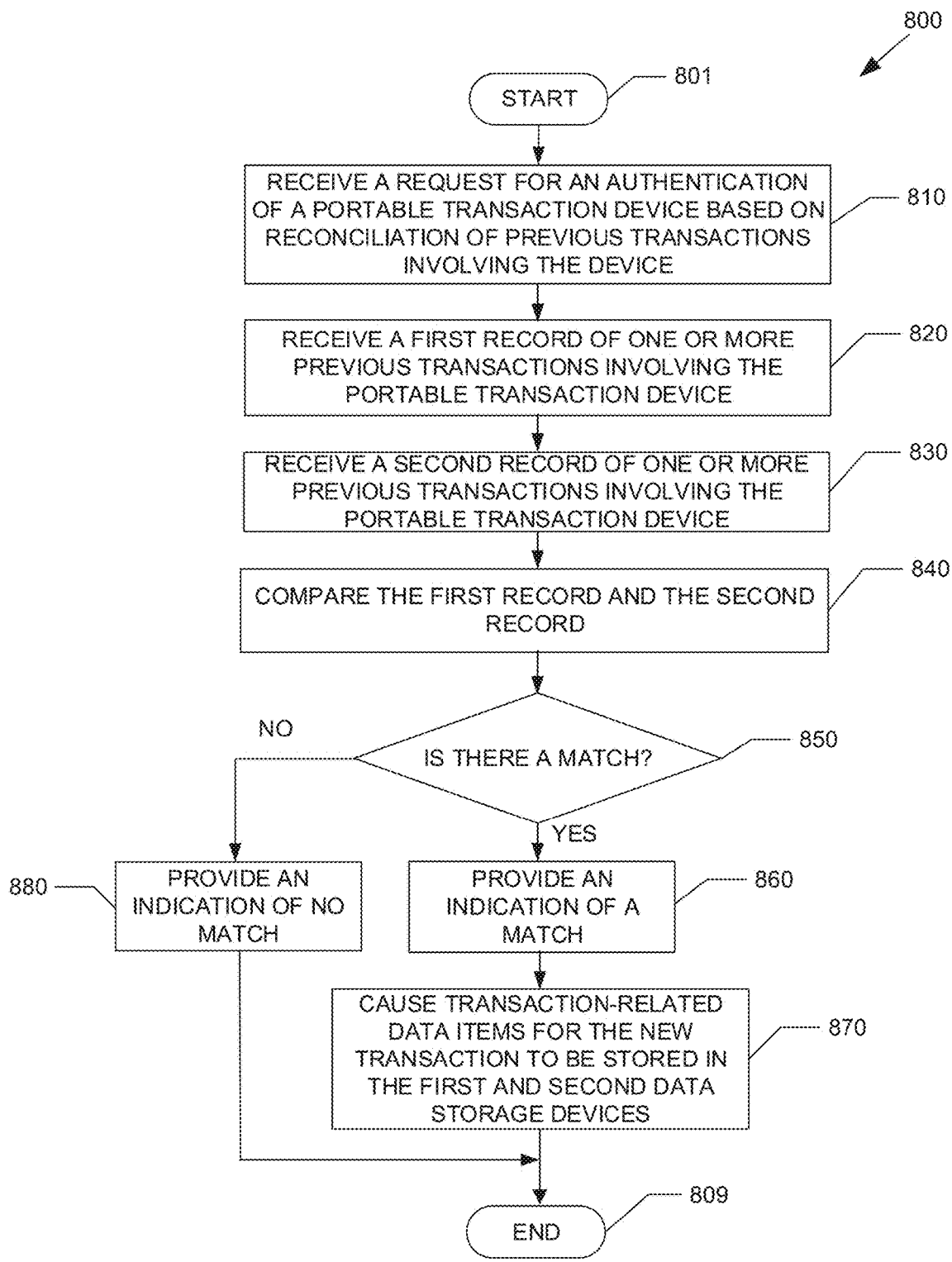
FIG. 8 is a flowchart illustrating an example reconciliation-based authentication procedure from the perspective of a device configured to perform the procedure according to certain aspects of the present disclosure.

FIG. 8 is a flowchart illustrating an example process 800 for a reconciliation-based authentication procedure according to certain aspects of the present disclosure from the perspective of a device configured to perform the reconciliation-based authentication procedure.

The process 800 starts at state 801 and proceeds to operation 810, in which a processing module in a device receives a request for an authentication of the portable transaction device. The device that receives the request is hereinafter referred to as "the authentication device." The authentication device can be the portable transaction device, a transaction processing system configured to process transactions involving the portable transaction device, or an interface device configured to facilitate communications between the portable transaction device and the transaction processing system. In some embodiments, the authentication device performs a token-based authentication and/or a biometric-based authentication before, during, or after the reconciliation-based authentication. Non-limiting examples of the portable transaction device include a smart payment card, a smart computer access card, a smart facility access card, a mobile terminal configured for payment transactions, or a mobile terminal configured for computer or facility access transactions. Non-limiting examples of the transaction processing system include a payment processing system (e.g., for credit card or debit card transactions), a central computer system (including, e.g., server(s) and database(s)), or a dedicated access controller. Non-limiting examples of the interface device include a fixed or portable POS terminal, a mobile terminal, and a contact or contactless smart card or smart fob readers.

The process 800 proceeds to operation 820, in which a processing module in the authentication device receives a first record of one or more previous transactions involving the portable transaction device from a first data storage device configured to store data items related to transactions involving the portable transaction device. Non-limiting examples of such transaction-related data items include tokens or passwords used, locations, transaction times and durations, products or services purchased, and/or accessed files and applications. The first data storage device can be a memory (e.g., a database) at the transaction processing system, a memory in the portable transaction device, or a memory in the interface device. The first data storage device can be in the authentication device or in another device in the electronic transaction system.

The process 800 proceeds to operation 830, in which a processing module in the authentication device receives a second record of one or more previous transactions involving the portable transaction device from a second data storage device configured to store data items related to transactions involving the portable transaction device. Non-limiting examples of such transaction-related data items include tokens or passwords used, locations, transaction times and durations, products or services purchased, and/or accessed files and applications. The second data storage device can be a memory (e.g., a database) at the transaction processing system, a memory in the portable transaction device, or a memory in the interface device. The second data storage device can be in the authentication device or in another device in the electronic transaction system.

The process 800 proceeds to operation 840, in which a processing module in the authentication device compares the first record to the second record to determine if there is a match. The comparison can involve one or more transaction-related data items in the first record with one or more transaction-related data items in the second record. For example, security tokens and transaction times in the first record can be compared to security tokens and transaction times in the second record.

The process 800 proceeds to query state 850, in which a processing module in the authentication device determines if there is a match between the first and second records. If the answer to the query is "yes" (i.e., there is a match), the process 800 proceeds to operation 860, in which the processing module provides an indication of the match to a device from which the authentication device received the request at operation 810. The process 800 proceeds to operation 870, in which a processor in the conciliation device causes one or more transaction-related data items for the new transaction be stored in the first storage device and the second storage device.

On the other hand, if the answer to the query at the state 850 is "no" (i.e., there is no match), the process 800 proceeds to operation 880, in which a processor in the authentication device provides an indication of no match to a device from which the authentication device received the request at operation 810. The process 800 ends a state 809.

Figure 9:
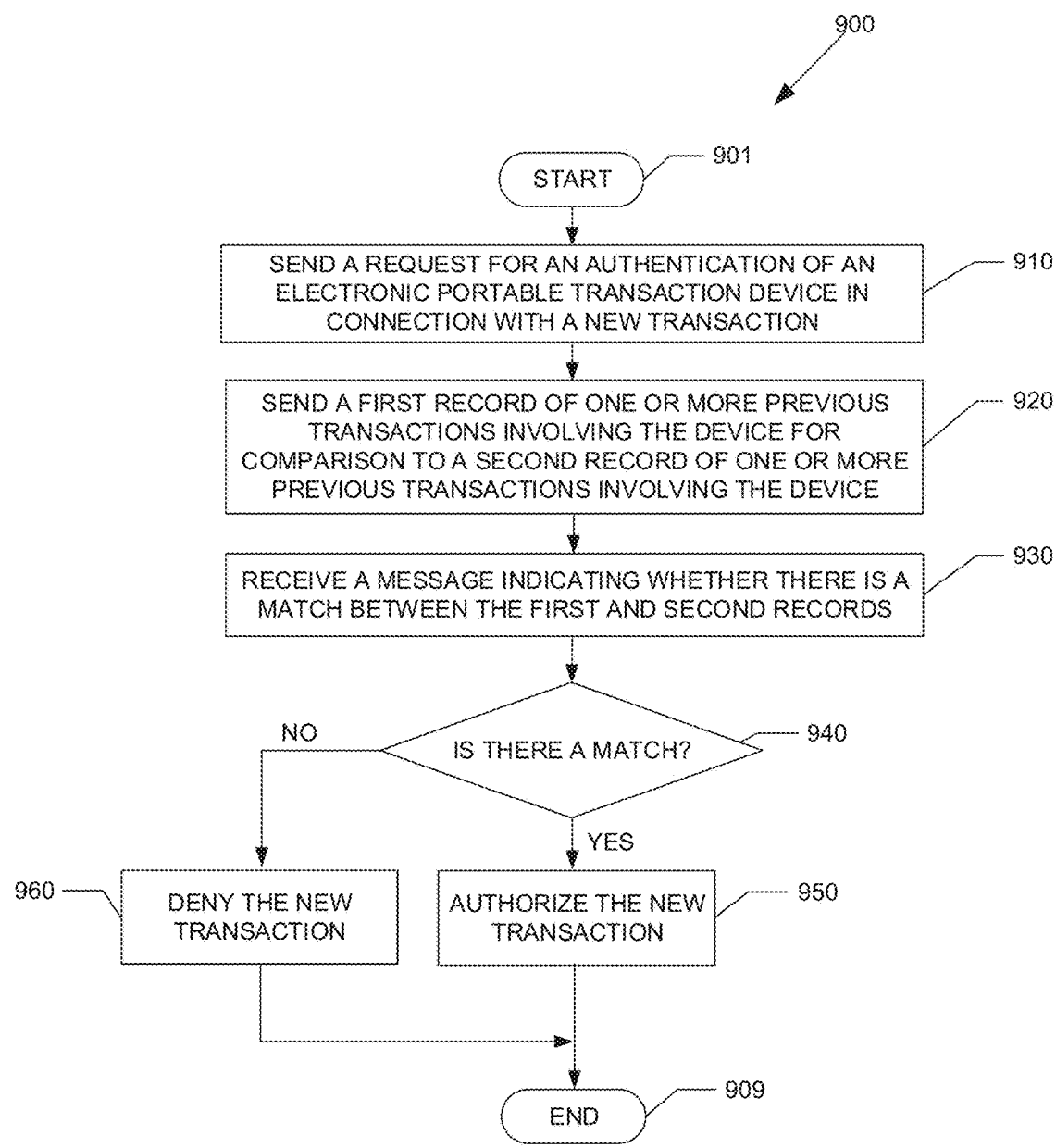
FIG. 9 is a flowchart illustrating an example reconciliation-based authentication procedure from the perspective of a device configured to send a request the procedure according to certain aspects of the present disclosure.

FIG. 9 is a flowchart illustrating an example process 900 for a reconciliation-based authentication procedure according to certain aspects of the present disclosure from the perspective of a device configured to send a request for an authentication. The process 900 starts at state 901 and proceeds to operation 910, in which a processing module in a device sends a request for an authentication of an electronic portable transaction device to the authentication device described above with respect to FIG. 8, either directly or via another device (e.g., an interface device). The device that sends the request is hereinafter referred to as "the requesting device." The requesting device sends the authentication request in connection with a new transaction involving the electronic portable transaction device.

It shall be appreciated by those skilled in the art in view of the present disclosure that there are numerous possible pairs of a requesting device and an authentication device. In the electronic payment system 400 of FIG. 4, for example, the requesting device can be one of the interface devices 420A-E and the authentication device can be the corresponding one of the portable transaction devices 410A-E, or vice versa. Alternatively, the requesting device can be one of the portable transaction devices 410A-E and the authentication device can be server(s) 432 at the payment processing system 430, or vice versa. Alternatively, the requesting device can be the server(s) 432 at the payment processing system 430 and the authentication device can be one of the interface devices 420A-E, or vice versa. In the electronic payment system 500 of FIG. 5, the requesting device can be one of the mobile terminals 520A-B and the authentication device can be one of the smart payment cards 510A-B, or vice versa. Alternatively, the requesting device can be one of the mobile terminals 520A-C and the authentication device can be the server(s) 532 at the payment processing system 530, or vice versa. Alternatively, the requesting device can be the server(s) 532 at the payment processing system 530 and the authentication device can be one of the smart payment cards 510A-B, or vice versa.

The process 900 proceeds to operation 920, in which a processing module in the requesting device sends a first record of one or more previous transactions involving the electronic portable transaction device to the authentication device for reconciliation (e.g., comparison) with a second record of one or more previous transactions involving the electronic portable transaction device, either directly or via another device (e.g., an interface device).

The process 900 proceeds to operation 930 in which a processing module in the requesting device receives a message indicating whether there is a match between the first record and the second record.

The process 900 proceeds to query state 940, in which a processing module in the requesting device determines whether the message indicates that there is a match between the first record and the second record. If the answer to the query is "yes" (i.e., there is a match), the process 900 proceeds to operation 950, in which a processing module in the requesting device authorizes the new transaction for which the authentication request was sent in operation 910.

On other hand, if the answer to the query is "no" (i.e., there is no match), the process 900 proceeds to operation 960, in which a processing module in the requesting device denies the new transaction. In some embodiments, the requesting device may also cause the portable transaction device to be disabled. The process 900 ends at state 909.

It shall be appreciated by those skilled in the art in view of the present disclosure that various described operations of the exemplary processes 800 and 900 may be performed in different orders, optionally skipped, and/or removed. For example, in an electronic transaction system in which the authentication device is also the device that initiates and/or authorizes new transactions, the operation 810 in the process 800 illustrated in FIG. 8 and the process 900 illustrated in FIG. 9 may not be performed. In certain embodiments, the operation 870 relating to storage of transaction-related data items for the new transaction may not be performed by the authentication device as part of the process 800. Instead, such a storage is performed by the requesting device as part of the process 900 after receiving a message indicating a match between the first and second records.

The description of the technology is provided to enable any person skilled in the art to practice the various embodiments described herein. While the technology has been particularly described with reference to the various figures and embodiments, it should be understood that these are for illustration purposes only and should not be taken as limiting the scope of the various embodiments.

There may be many other ways to implement the various embodiments. Various functions and elements described herein may be partitioned differently from those shown without departing from the spirit and scope of the technology disclosed. Various modifications to these embodiments will be readily apparent to those skilled in the art, and generic principles defined herein may be applied to other embodiments. Thus, many changes and modifications may be made to the various embodiments, by one having ordinary skill in the art, without departing from the spirit and scope of the various embodiments.

A reference to an element in the singular is not intended to mean "one and only one" unless specifically stated, but rather "one or more." The term "some" refers to one or more. Underlined and/or italicized headings and subheadings are used for convenience only, do not limit the scope of the various embodiments, and are not referred to in connection with the interpretation of the description of the embodiment. All structural and functional equivalents to the elements of the various embodiments of the technology described throughout this disclosure that are known or later come to be known to those of ordinary skill in the art are expressly incorporated herein by reference and intended to be encompassed by the technology disclosed. Moreover, nothing disclosed herein is intended to be dedicated to the public regardless of whether such disclosure is explicitly recited in the above description.

We claim:

1. A method of enhancing security of an electronic transaction involving a smart card during interactions with one or more external computing devices, the method performed by the smart card that includes a physical processor, comprising:

(a) receiving by the physical processor of the smart card a request for an authentication of an electronic portable transaction device in connection with a new electronic transaction involving the smart card;

(b) accessing by the physical processor a first record of one or more previous electronic transactions involving the smart card from a first storage device coupled to the physical processor;

(c) retrieving by the physical processor over a data communication network that includes a wide area data communication network, a second record of one or more previous electronic transactions involving the smart card from a second storage device coupled to a computing device located external to the smart card; and (d) determining whether the first record and the second record are reconcilable by comparing by the physical processor of the smart card a first subset of one or more previous electronic transactions in the first record that satisfy one or more predetermined criteria with a second subset of one or more previous electronic transactions in the second record that satisfy the one or more predetermined criteria.

2. The method of claim 1 further comprising authorizing the new electronic transaction if the first record and the second record are reconcilable.

3. The method of claim 2, wherein the step of authorizing comprises sending an indication that the first record and the second record are reconcilable to an external device that sent the request.

4. The method of claim 1 further comprising disabling the smart card if the first record and the second record are not reconcilable.

5. The method of claim 1 further comprising: performing a biometric authentication, and authorizing the new electronic transaction if the first record and the second record are reconcilable and the biometric authentication is successful.

6. The method of claim 1, further comprising determining whether there is at least a predetermined number of matches between the first set and the second set.

7. The method of claim 1, wherein the one or more predetermined criteria comprise a minimum amount of transaction.

8. The method of claim 1, wherein the first storage device is located at the smart card, and the second storage device is located at a transaction processing system.

9. A smart card for enhancing security of a new electronic transaction comprising:
 a first storage device configured to store one or more previous transactions involving the smart card;
 a physical processor coupled to the first storage device and configured to execute a program configured to:
  receive a request for an authentication of an electronic portable transaction device in connection with a new electronic transaction involving the smart card,
  access from the first storage device a first record of one or more previous electronic transactions involving the smart card,
  retrieve from a second storage device coupled to a computing device located external to the smart card over a data communication network that includes a wide area data communication network, a second record of one or more previous electronic transactions involving the smart card,
  compare a first subset of one or more previous electronic transactions in the first record that satisfy one or more predetermined criteria with a second subset of one or more previous electronic transactions in the second record that satisfy the one or more predetermined criteria, and
  authorize the new electronic transaction if there is a match between the first subset and the second subset; and
 a memory coupled to the physical processor and configured to store the program.

10. The smart card of claim 9 further comprising a biometric authentication module configured to perform a biometric authentication procedure, wherein the physical processor is configured authorize the new electronic transaction if the first record and the second record are reconcilable and the biometric authentication procedure is successful.

* * * * *